US007285166B2

(12) United States Patent
Luke et al.

(10) Patent No.: US 7,285,166 B2
(45) Date of Patent: *Oct. 23, 2007

(54) ZEOLITE-CONTAINING CEMENT COMPOSITION

(75) Inventors: Karen Luke, Duncan, OK (US); B. Raghava Reddy, Duncan, OK (US); Russell M. Fitzgerald, Velma, OK (US); Frank Zamora, Duncan, OK (US); Glen C. Fyten, Red Deer (CA); Keith A. Rispler, Red Deer (CA); Donald A. Getzlaf, Calgary (CA); Dennis W. Gray, Comanche, OK (US); Sears T. Dealy, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/126,626

(22) Filed: May 11, 2005

(65) Prior Publication Data

US 2005/0204962 A1    Sep. 22, 2005

Related U.S. Application Data

(60) Division of application No. 10/686,098, filed on Oct. 15, 2003, now Pat. No. 6,964,302, which is a continuation-in-part of application No. 10/623,443, filed on Jul. 18, 2003, which is a continuation-in-part of application No. 10/315,415, filed on Dec. 10, 2002, now Pat. No. 6,989,057.

(51) Int. Cl.
*C04B 7/00* (2006.01)
*C04B 14/00* (2006.01)
*C04B 14/04* (2006.01)

(52) U.S. Cl. ............... 106/813; 106/725; 106/773; 106/774; 106/781; 106/782; 106/803; 106/809

(58) Field of Classification Search ........... 106/606, 106/607, 608, 609, 617, 618, 626, 634, 672, 106/674, 677, 813, 694, 696, 706, 708, 713, 106/717, 718, 719, 724, 725, 773, 774, 781, 106/782, 803, 809
See application file for complete search history.

(56) References Cited

U.S. PATENT DOCUMENTS

| | | | |
|---|---|---|---|
| 1,943,584 A | 1/1934 | Cross | |
| 2,094,316 A | 9/1937 | Cross | |
| 2,131,338 A | 9/1938 | Vail | |
| 2,349,049 A | 5/1944 | Means | |
| 2,662,827 A | 12/1953 | Clark | |
| 2,727,001 A | 12/1955 | Rowe | |
| 2,848,084 A | 8/1958 | Williams | |
| 3,047,493 A | 7/1962 | Rosenberg | |
| 3,065,170 A | 11/1962 | Dumbauld et al. | |
| 3,179,528 A | 4/1965 | Holmgren et al. | |
| 3,293,040 A | 12/1966 | Shaler, Jr. et al. | |
| 3,359,225 A | 12/1967 | Weisend | |
| 3,694,152 A | 9/1972 | Sersale et al. | |
| 3,781,225 A | 12/1973 | Schwartz | |
| 3,884,302 A | 5/1975 | Messenger | |
| 3,887,385 A | 6/1975 | Quist et al. | |
| 3,888,998 A | 6/1975 | Sampson et al. | |
| 3,963,508 A | 6/1976 | Masaryk | |
| 4,054,462 A | 10/1977 | Stude | |
| 4,141,843 A | 2/1979 | Watson | |
| 4,217,229 A | 8/1980 | Watson | |
| 4,311,607 A | 1/1982 | Kaeser | |
| 4,363,736 A | 12/1982 | Block | |
| 4,368,134 A | 1/1983 | Kaeser | |
| 4,372,876 A | 2/1983 | Kulprathipanja et al. | |
| 4,435,216 A | 3/1984 | Diehl et al. | |
| 4,444,668 A | 4/1984 | Walker et al. | |
| 4,468,334 A | 8/1984 | Cox et al. | |
| 4,474,667 A | 10/1984 | Block | |
| 4,482,379 A | 11/1984 | Dibrell et al. | |
| 4,515,635 A | 5/1985 | Rao et al. | 106/90 |
| 4,530,402 A | 7/1985 | Smith et al. | 166/291 |
| 4,536,297 A | 8/1985 | Loftin et al. | |
| 4,548,734 A | 10/1985 | Chaux et al. | |
| 4,552,591 A | 11/1985 | Millar | |
| 4,555,269 A | 11/1985 | Rao et al. | 106/90 |
| 4,557,763 A | 12/1985 | George et al. | 106/90 |

(Continued)

FOREIGN PATENT DOCUMENTS

CA    2153372    9/1996

(Continued)

OTHER PUBLICATIONS

SPE 20624 entitled "Acidization of Analcime-Cementing Sandstone, Gulf Of Mexico", by D.R. Underdown et al., dated 1990, no month.

(Continued)

*Primary Examiner*—Elizabeth D. Wood
(74) *Attorney, Agent, or Firm*—Craig W. Roddy; Haynes and Boone

(57) ABSTRACT

Methods and cement compositions are provided for sealing a subterranean zone penetrated by a wellbore, wherein the cement composition comprises zeolite, cementitious material, and a mixing fluid.

29 Claims, No Drawings

U.S. PATENT DOCUMENTS

| | | |
|---|---|---|
| 4,632,186 A | 12/1986 | Boncan et al. |
| 4,650,593 A | 3/1987 | Slingerland |
| 4,676,317 A | 6/1987 | Fry et al. ............... 166/293 |
| 4,703,801 A | 11/1987 | Fry et al. ............... 166/293 |
| 4,717,488 A | 1/1988 | Seheult et al. |
| 4,772,307 A | 9/1988 | Kiss et al. |
| 4,784,693 A | 11/1988 | Kirkland et al. |
| 4,818,288 A | 4/1989 | Aignesberger et al. ....... 106/90 |
| 4,888,120 A | 12/1989 | Mueller et al. |
| 4,943,544 A * | 7/1990 | McGarry et al. ............ 501/124 |
| 4,986,989 A | 1/1991 | Sirosita et al. |
| 5,121,795 A | 6/1992 | Ewert et al. ............. 166/292 |
| 5,123,487 A | 6/1992 | Harris et al. ............. 166/277 |
| 5,125,455 A | 6/1992 | Harris et al. ............. 166/292 |
| 5,127,473 A | 7/1992 | Harris et al. ............. 166/277 |
| 5,151,131 A | 9/1992 | Burkhalter et al. ........ 106/822 |
| 5,238,064 A | 8/1993 | Dahl et al. .............. 166/293 |
| 5,340,860 A | 8/1994 | Brake et al. ............. 524/166 |
| 5,346,012 A | 9/1994 | Heathman et al. ......... 166/293 |
| 5,383,967 A | 1/1995 | Chase ....................... 106/737 |
| 5,435,846 A | 7/1995 | Tatematsu et al. ......... 106/813 |
| 5,494,513 A | 2/1996 | Fu et al. ................... 106/672 |
| 5,527,387 A * | 6/1996 | Andersen et al. .......... 106/693 |
| 5,529,624 A | 6/1996 | Riegler ..................... 106/675 |
| 5,588,489 A | 12/1996 | Chatterji et al. |
| 5,626,665 A | 5/1997 | Barger et al. ............. 106/706 |
| 5,658,624 A * | 8/1997 | Anderson et al. .......... 428/34.7 |
| 5,680,900 A | 10/1997 | Nguyen et al. ............ 166/295 |
| 5,711,383 A | 1/1998 | Terry et al. ................. 175/72 |
| 5,716,910 A | 2/1998 | Totten et al. .............. 507/102 |
| 5,759,964 A | 6/1998 | Shuchart et al. ........... 507/209 |
| 5,788,762 A | 8/1998 | Barger et al. ............. 106/706 |
| 5,789,352 A | 8/1998 | Carpenter et al. ......... 507/209 |
| 5,807,810 A | 9/1998 | Blezard et al. |
| 5,851,960 A | 12/1998 | Totten et al. .............. 507/118 |
| 5,866,517 A | 2/1999 | Carpenter et al. ......... 507/226 |
| 5,980,446 A | 11/1999 | Loomis et al. ............. 588/250 |
| 5,990,052 A | 11/1999 | Harris ....................... 507/214 |
| 6,063,738 A | 5/2000 | Chatterji et al. ........... 507/269 |
| 6,070,664 A | 6/2000 | Dalrymple et al. ......... 166/281 |
| 6,138,759 A | 10/2000 | Chatterji et al. |
| 6,145,591 A | 11/2000 | Boncan et al. ............. 166/291 |
| 6,149,724 A | 11/2000 | Ulibarri et al. |
| 6,170,575 B1 | 1/2001 | Reddy et al. .............. 166/293 |
| 6,171,386 B1 | 1/2001 | Sabins ....................... 106/724 |
| 6,182,758 B1 | 2/2001 | Vijn |
| 6,209,646 B1 | 4/2001 | Reddy et al. |
| 6,213,213 B1 | 4/2001 | Van Batenburg et al. ... 166/300 |
| 6,230,804 B1 | 5/2001 | Mueller et al. ............. 166/293 |
| 6,235,809 B1 | 5/2001 | Arias et al. ................. 523/130 |
| 6,245,142 B1 | 6/2001 | Reddy et al. .............. 106/724 |
| 6,283,213 B1 | 9/2001 | Chan ......................... 166/291 |
| 6,372,694 B1 | 4/2002 | Osinga et al. |
| 6,379,456 B1 | 4/2002 | Heathman et al. ......... 106/724 |
| 6,390,197 B1 | 5/2002 | Maroy |
| 6,405,801 B1 | 6/2002 | Vijn et al. .................. 166/293 |
| 6,409,819 B1 | 6/2002 | Ko .............................. 106/707 |
| 6,457,524 B1 | 10/2002 | Roddy ....................... 166/293 |
| 6,475,275 B1 | 11/2002 | Nebesnak et al. .......... 106/803 |
| 6,478,869 B2 | 11/2002 | Reddy et al. .............. 106/724 |
| 6,488,091 B1 | 12/2002 | Weaver et al. ............. 166/300 |
| 6,494,951 B1 | 12/2002 | Reddy et al. .............. 106/705 |
| 6,508,305 B1 | 1/2003 | Brannon et al. ............ 166/293 |
| 6,555,505 B1 | 4/2003 | King et al. ................. 507/202 |
| 6,565,647 B1 | 5/2003 | Day et al. ................... 106/813 |
| 6,566,310 B2 | 5/2003 | Chan ......................... 507/211 |
| 6,572,698 B1 | 6/2003 | Ko .............................. 106/772 |
| 6,610,139 B2 | 8/2003 | Crook et al. ............... 106/724 |
| 6,616,753 B2 | 9/2003 | Reddy et al. .............. 106/718 |
| 6,626,243 B1 | 9/2003 | Boncan ...................... 166/293 |
| 6,645,289 B2 | 11/2003 | Sobolev et al. ............. 106/705 |
| 6,660,080 B2 | 12/2003 | Reddy et al. ............... 106/724 |
| 6,702,044 B2 | 3/2004 | Reddy et al. ............... 175/64 |
| 6,722,434 B2 | 4/2004 | Reddy et al. |
| 6,767,868 B2 | 7/2004 | Dawson et al. |
| 6,786,966 B1 | 9/2004 | Johnson et al. |
| 6,832,652 B1 | 12/2004 | Dillenbeck et al. |
| 6,840,319 B1 | 1/2005 | Chatterji et al. |
| 6,889,767 B2 | 5/2005 | Reddy et al. |
| 7,137,448 B2 | 11/2006 | Arias et al. ................. 466/292 |
| 7,182,137 B2 | 2/2007 | Fyten et al. |
| 2001/0014651 A1 | 8/2001 | Reddy et al. ............... 502/408 |
| 2002/0077390 A1 | 6/2002 | Gonnon et al. ............. 524/2 |
| 2002/0091177 A1 | 7/2002 | Gonnon et al. ............. 524/5 |
| 2002/0117090 A1 | 8/2002 | Ku .............................. 106/737 |
| 2002/0157575 A1 | 10/2002 | DiLullo et al. ............. 106/711 |
| 2003/0153466 A1 | 8/2003 | Allen et al. ................. 504/358 |
| 2003/0203996 A1 | 10/2003 | Gonnon et al. ............. 524/5 |
| 2004/0007162 A1 | 1/2004 | Morioka et al. ............ 106/714 |
| 2004/0040475 A1 | 3/2004 | Roij ........................... 106/819 |
| 2004/0107877 A1 | 6/2004 | Getzlaf et al. .............. 106/813 |
| 2004/0108113 A1 | 6/2004 | Luke et al. ................. 166/292 |
| 2004/0112600 A1 | 6/2004 | Luke et al. ................. 166/295 |
| 2004/0168803 A1 | 9/2004 | Reddy et al. ............... 166/293 |
| 2004/0187740 A1 | 9/2004 | Timmons |
| 2004/0188091 A1 | 9/2004 | Luke et al. ................. 166/291 |
| 2004/0188092 A1 | 9/2004 | Santra et al. ............... 166/291 |
| 2004/0244977 A1 | 12/2004 | Luke et al. ................. 166/292 |
| 2004/0262000 A1 | 12/2004 | Morgan et al. |
| 2004/0262001 A1 | 12/2004 | Caveny et al. |
| 2005/0000734 A1 | 1/2005 | Getzlaf et al. ............... 175/73 |
| 2005/0034864 A1 | 2/2005 | Caveny et al. |
| 2005/0133222 A1 | 6/2005 | Arias et al. |
| 2006/0025312 A1 | 2/2006 | Santra et al. |

FOREIGN PATENT DOCUMENTS

| | | |
|---|---|---|
| EP | 0 802 253 A1 | 10/1997 |
| EP | 0 895 971 A1 | 2/1999 |
| EP | 1 260 491 A1 | 11/2002 |
| EP | 1 428 805 A1 | 6/2004 |
| FR | 763.998 | 2/1934 |
| GB | 1469954 | 4/1977 |
| GB | 2 353 523 A | 2/2001 |
| JP | J 52117316 A | 1/1977 |
| JP | 61021947 A | 1/1986 |
| JP | J 07003254 | 1/1995 |
| JP | J 10110487 | 4/1998 |
| SU | 1373781 | 2/1988 |
| WO | WO 98/54108 | 12/1998 |
| WO | WO 01/70646 A1 | 9/2001 |
| WO | WO 2005/059301 A1 | 6/2005 |

OTHER PUBLICATIONS

SPE 39595 entitled "Designing a Remedial Acid Treatment for Gulf of Mexico Deepwater Turbidite Sands Containing Zeolite Cement", by B.A. Rogers et al., dated 1998, no month.

Paper entitled "Tectonis, fluid migration, and fluid pressure in a Deformed forearc basin, Cook Inlet, Alaska", by R.L. Bruhn et al., pp. 550-563, dated 2000, no month.

Paper entitled "Hydraulic Conductivity Measurement On Discrete Samples Collected From Leg 141, Site 863", by Kevin Brown, pp. 401-405, dated 1995, no month.

Paper entitled "Alteration of Clay Minerals And Zeolites In Hydrothermal Brines", by Sridhar Komarneni et al., pp. 383-391, dated 1983, no month.

Paper entitled "A Non-Conventional Way of Developing Cement Slurry For Geothermal Wells", by V. Barlet-Gouedard et al., pp. 85-91, dated 2001, no month.

Paper entitled "Portland-Zeolite-Cement For Minimizing Alkali-Aggregate Expansion", by R. Sersale, pp. 404-410, dated 1987, no month.

Paper entitled "Zeolite Crystallization In Portland Cement Concrete Due To Alkali-Aggregate Reaction", by S.A. Marfil et al., pp. 1283-1288, dated 1993, no month.

Paper entitled "A study on the hydration rate of natural zeoite blended Cement pastes", by C.S. Poon et al., pp. 427-432, dated 1999, no month.

Paper entitled "Zeolite ceramsite cellular concrete", by N-Q. Feng pp. 117-122, dated 2000, no month.

Paper entitled "Immobilization of caesium-loaded ion exchange resins in Zeolite-cement blends", by Sandor Bagosi et al., pp. 479-485, dated 1999, no month.

Paper entitled "Effect of Bentonite and Zeolite on Durability of Cement Suspension under Sulfate Attack", by Ivan Janotka, pp. 710-715, dated 1988, no month.

Paper entitled "Reuse of waste catalysts from petrochemical industries For cement substitution", by Nan Su et al., pp. 1773-1783, dated 2000, no month.

Paper entitled "Extreme vertices design of concrete with combined Mineral admixtures", by Jian-Tong Ding et al., pp. 957-960, dated 1999, no month.

Paper entitled "The Properties of Mortar Using Blends with Portland Cement Clinker, Zeolite Tuff and Gypsum", by Ivan Janotka, et al., pp. 105-110, dated 1995, no month.

Paper entitled "Study on the suppression effect of natural zeolite on Expansion of concrete due to alkali-aggregate reaction", by Feng Naiqian et al., pp. 17-24, dated 1998, no month.

Paper entitled "Comparative study of the initial surface absorption and Chloride diffusion of high performance zeolite, silica fume and PFA Concrete", by Sammy Y.N. Chen et al., pp. 293-300, dated 1999, no month.

Paper entitled "A study on the hydration rate of natural zeolite Blended cement pastes", by C.S. Poon et al., pp. 427-432, dated 1999, no month.

Paper entitled "Zeolite P In Cements: Its Potentioanl For Immobilizing Toxic and Radioactive Waster Species" by M. Atkins et al., Waste Management, vol. 15, No. 2, pp. 127-135, dated 1999, no month.

Baroid Brochure entitled "Aquagel Gold Seal®" dated 2002, no month.

Halliburton brochure entitled "CFR-2 Cement Friction Reducer" dated 1999, no month.

Halliburton brochure entitled "CFR-3 Cement Friction Reducer" dated 1998, no month.

Halliburton brochure entitled "D-Air 2 Anti-Foam Agent" dated 1999, no month.

Halliburton brochure entitled Halad®-344 Fluid-Loss Additive dated 1998, no month.

Halliburton brochure entitled "Halad®-413 Fluid-Loss Additive" dated 1999, no month.

Halliburton brochure entitled "HR®-5 Cement Additive" dated 1998, no month.

Halliburton brochure entitled "HR®-7 Cement Retarder" dated 1999, no month.

Halliburton brochure entitled "MICROSAND Cement Additive" dated 1999, no month.

Halliburton brochure entitled SSA-1 Strength-Stabilizing Agent dated 1998.

Halliburton brochure entitled "SSA-2 Coarse Silica Flour" dated 1999.

Paper entitled "Hydraulic Engineering Cement," International Center for Materials Technology Promotion, dated 2003.

Paper entitled "Portland Cement, Concrete and Heat of Hydration," Concrete Technology Today, vol. 18, No. 2, dated Jul. 1997.

Office action from a related counterpart application dated Dec. 4, 2003.

Office action from a related counterpart application dated Jun. 25, 2004.

Office action from a related counterpart application dated Sep. 10, 2004.

Office action from a related counterpart application dated Nov. 9, 2004.

Foreign communication from a related counterpart application dated Mar. 25, 2004.

Foreign communication from a related counterpart application dated Aug. 23, 2004.

Foreign communication from a related counterpart application dated Nov. 25, 2004.

Foreign communication from a related counterpart application dated Jul. 28, 2005.

Office action from a related counterpart application dated Sep. 7, 2005.

Office action from a related counterpart application dated Nov. 4, 2005, , U.S. Appl. No. 10/727,370.

Office action from a related counterpart application dated Nov. 7, 2005, serial No. 10/738,1999.

Office Action from a related counterpart U.S. Appl. No. 10/795,158, filed Dec. 6, 2005.

Office Action from a related counterpart application, U.S. Appl. No. 10/623,443, filed Mar. 3, 2006.

Luke, K. et al., "Zeolite-Containing Remedial Compositions" filed Jul. 17, 2006 as U.S. Appl. No. 11/488,388.

Office action from U.S. Appl. No. 10/623,443, filed Jul. 27, 2006.

Fyten, Glen et al., "Cementitious Compositions Containing Interground Cement Clinker and Zeolite" filed Nov. 8, 2006 as U.S. Appl. No. 11/594,435.

Fyten, Glen et al., "Cementitious Compositions Containing Interground Cement Clinker and Zeolite" filed Nov. 8, 2006 as U.S. Appl. No. 11/594,326.

Fyten, Glen et al., "Cementitious Compositions Containing Interground Cement Clinker and Zeolite" filed Nov. 8, 2006 as U.S. Appl. No. 11/594,430.

Office action from application U.S. Appl. No. 11/388,485, filed Aug. 11, 2006.

* cited by examiner

ZEOLITE-CONTAINING CEMENT COMPOSITION

CROSS-REFERENCE TO RELATED APPLICATIONS

This application is a divisional of prior application Ser. No. 10/686,098 filed Oct. 15, 2003, (now U.S. Pat. No. 6,964,302, issued Nov. 15, 2005), the entire disclosure of which is incorporated herein by reference, which is a continuation-in-part of prior application application Ser. No. 10/623,443, filed Jul. 18, 2003, the entire disclosure of which is incorporated herein by reference, which is a continuation-in-part of prior application Ser. No. 10/315,415, filed Dec. 10, 2002, (now U.S. Pat. No. 6,989,057, issued Jan. 24, 2006), the entire disclosure of which is incorporated herein by reference.

BACKGROUND

The present embodiment relates generally to methods and cement compositions for sealing a subterranean zone penetrated by a wellbore.

In the drilling and completion of an oil or gas well, a cement composition is often introduced in the wellbore for cementing pipe string or casing. When the desired drilling depth of the well is reached, a cement composition is pumped into the annular space between the walls of the wellbore and the casing. In this process, known as "primary cementing", the cement composition sets in the annular space, supporting and positioning the casing, and forming a substantially impermeable barrier, or cement sheath, which isolates the wellbore from subterranean zones. It is understood that the performance of the cement composition is important to achieving and maintaining zonal isolation. Throughout the life of a well, especially if zonal isolation is comprised, secondary cementing operations, such as remedial cementing and repairs to existing cemented areas, will be performed on the well.

DESCRIPTION

A method of sealing a subterranean zone penetrated by a wellbore according to the present embodiments comprises preparing a cement mix comprising a base blend comprising zeolite and at least one cementitious material, mixing the cement mix with water to form a cement composition, placing the cement composition into the subterranean zone, and allowing the cement composition to set therein. A cement composition for sealing a subterranean zone penetrated by a wellbore according to the present embodiments comprises zeolite, at least one cementitious material, and a mixing fluid. In a preferred method of sealing a subterranean zone penetrated by a wellbore, a cement composition comprising zeolite, cementitious material, and water is prepared, placed into the subterranean zone, and allowed to set therein.

A variety of cementitious materials can be used with the present embodiments, including but not limited to hydraulic cements. Hydraulic cements set and harden by reaction with water, and are typically comprised of calcium, aluminum, silicon, oxygen, and/or sulfur. Hydraulic cements include Portland cements, pozzolan cements, gypsum cements, aluminous cements, silica cements, and alkaline cements. According to preferred embodiments, the cementitious material comprises at least one API Portland cement. As used herein, the term API Portland cement means any cements of the type defined and described in API Specification 10, 5$^{th}$ Edition, Jul. 1, 1990, of the American Petroleum Institute (the entire disclosure of which is hereby incorporated as if reproduced in its entirety), which includes Classes A, B, C, G, and H. According to certain embodiments disclosed herein, the cementitious material comprises any of Classes A, C, G and H cement. The preferred amount of cementitious material is understandably dependent on the cementing operation.

Zeolites are porous alumino-silicate minerals that may be either a natural or manmade material. Manmade zeolites are based on the same type of structural cell as natural zeolites and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

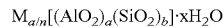

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range of from greater than or equal to 1 to less than or equal to 5; and x represents the moles of water entrained into the zeolite framework.

Preferred zeolites for use in the cement compositions of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). Most preferably, the zeolite for use in the cement compositions of the present invention comprises one of chabazite and clinoptilolite.

As shown in the following examples, zeolites provide enhanced properties in a number of embodiments of cement compositions. For example, according to some embodiments, cement compositions comprising zeolite exhibit an increase in early compressive strength development at low temperatures. In other embodiments, cement compositions comprising zeolite exhibit thixotropic properties which can be of benefit in such applications as gas migration control, lost circulation and squeeze cementing. According to still other embodiments, cement compositions comprising zeolite have fluid loss control qualities that enable maintenance of a consistent fluid volume within the cement composition, and prevent formation fracture (lost circulation) or flash set (dehydration).

In one embodiment, a cement mix comprises zeolite mixed with a base blend comprising 100% by weight cementitious material. In another embodiment, a cement mix comprises a base blend comprising zeolite in an amount of from about 5 to about 75 weight percent. In another embodiment, a cement mix comprises a base blend comprising zeolite in an amount of from about 30 to about 90 weight percent, and more preferably in an amount of from about 50 to about 75 weight percent. The preferred amount of zeolite is understandably dependent on the application for the cement composition. Exemplary applications are discussed further in the Examples herein.

Without limiting the scope of the invention, it is understood that the above-described cement compositions comprising zeolite have various applications, including but not limited to (1) lightweight cements; (2) normal weight cements; (3) densified cements; (4) squeeze cements; and (5) foamed cements. While there are no standard values with respect to the densities of the foregoing compositions, the term lightweight cement is understood by those of skill in the art to describe a cement composition having a density of less than about 15 lb/gal, the term normal weight cement is understood by those of skill in the art to describe a cement composition having a density of greater than about 15 lb/gal, but less than about 16 lb/gal, the term densified cement is understood by those of skill in the art to describe a cement composition having a density greater than about 16 lb/gal, and squeeze cements are understood by those of skill in the art to be cements of any density from densified to lightweight, depending on the application. For the purpose of the present disclosure, the terms "lightweight", "normal", "densified", and "squeeze" shall have the foregoing meanings as would be understood by one of ordinary skill in the art.

According to some embodiments, the cement mix comprises a base blend comprising zeolite and at least one cementitious material. According to other embodiments, the cement mix comprises zeolite mixed with a base blend comprising 100% by weight of at least one cementitious material. A variety of additives may be added into either of the above-described embodiments (i.e., a cement mix comprising a base blend comprising zeolite, or a cement mix comprising a base blend comprising 100% cementitious material.) When present, the additives comprise components of the cement mix in addition to the base blend.

Additives alter physical properties of cement compositions. Such additives may include density modifying materials (e.g., silica flour, sodium silicate, microfine sand, iron oxides and manganese oxides), dispersing agents, set retarding agents, set accelerating agents, fluid loss control agents, strength retrogression control agents, and viscosifying agents, all of which are well known to those of ordinary skill in the art.

For example, according to one embodiment, conventional accelerating additives such as sodium chloride, sodium sulfate, sodium aluminate, sodium carbonate, calcium sulfate, calcium carbonate, aluminum sulfate, potassium sulfate, potassium carbonate and alums, any of which can be used alone or in combination with other accelerating additives, are added to the cement mixes from which cement compositions are formed to further increase early compressive strength development. The accelerating additives are present in a total amount of about 0.5% to about 12% based on the total weight of the base blend comprising the cement mix, and more preferably, in a total amount of about 3% to about 9% based on the total weight of the base blend comprising the cement mix.

According to other embodiments, fluid loss control additives comprising anionic or non-ionic water based soluble polymers are added to a cement mix containing zeolite to provide effective fluid loss control for cement compositions formed from such cement mixes. According to these embodiments, the anionic or non-ionic water based soluble polymers may or may not be hydrophobically modified.

According to other embodiments, zeolite is used as a suspending aid, thixotropic agent, particle packing agent, strength retrogression prevention agent, strength enhancer, foamed cement-stability agent, a low temperature accelerator, a flow enhancing agent, a lightweight material and a friction reducer. For example, according to one such embodiment, a cement mix is formed by dry-mixing zeolite with cementitious material to form a base blend where the zeolite functions as a flow enhancing agent. According to this embodiment, the base blend comprises from about 1 to about 35 weight percent zeolite. Furthermore, conventional flow enhancing agents may be adsorbed on the zeolite to further enhance flow properties. Conventional flow enhancing agents are polar molecules known to those of ordinary skill in the art, and include but are not limited to organic acids, their salts, and acid anhydrides. A preferred conventional flow enhancing agent is acetic acid.

According to yet another embodiment, a lightweight cement composition is formed from a cement mix comprising a base blend comprising at least one cementitious material and zeolite, where the zeolite is present in an amount of about 35 to about 50 weight percent. The cement mix can then be added to a mixing fluid to form a lightweight cement composition. Conventionally, lightweight cement compositions are made by adding lightweight materials such as hollow microspheres, perlite and gilsonite to the cement mix for a given cement composition. These lightweight materials are dry blended with the cement mix, transported to a location, and mixed with water to form a cement composition. During blending and transportation, the lightweight materials tend to segregate from the rest of the cement mix due to their size and specific gravity differences with respect to the rest of the cement mix. In addition, depending on the density of the cement compositions formed from a cement mix, a high volume of the lightweight material may be present, which can cause additional segregation. The high volume also requires more mix water to form a slurry from the cement mix, which results in a reduction of the compressive strength obtained for the set cement resulting from the slurry. Using zeolites to form the base blend of a cement mix results in a reduction in segregation, a reduction in the amount of water required to form a slurry, and a lightweight cement composition with good compressive strength. In addition, a range of lightweight cement compositions can be produced from a single cement mix comprising zeolite by merely changing the amount of mixing fluid added to an amount of the cement mix to form a cement composition.

According to yet another embodiment, a cement mix is formed from a base blend comprising micro-fine zeolites. As used herein, micro-fine zeolites are zeolites with a mean particle size of about 10.00 microns or less. Cement compositions formed from cement mixes comprising such micro-fine zeolites possess early compressive strength development, provide good suspension (also referred to as "anti-settling") properties and are stable when formed as lightweight cement compositions. Cement compositions comprising micro-fine zeolites are useful in all cement applications, and are particularly useful in secondary cementing applications, for example, repairing microannuli, voids, and channels in the cement sheath.

According to yet another embodiment, a cement mix is formed comprising a base blend comprising zeolite, where the zeolite is incorporated into the base blend of the cement mix to act as a dispersant. According to this embodiment, when a zeolite is incorporated into the base blend of a cement mix, the zeolite reduces the apparent viscosity of cement compositions subsequently formed from the cement mix. Moreover, conventional dispersants such as sulfonated polymers including napathalene sulfonate, melamine sulfonate, styrene sulfonate, phenol sulfonate and ketone sulfonate can also be used in zeolite-containing cement mixes to reduce apparent viscosity. Furthermore, such conventional dispersants may be added to control fluid loss. An example of such conventional dispersant is sulfonated ketone acyclic aldehyde condensate available from Halliburton Energy Services, Duncan, Okla. When used, such conventional dispersants are generally present in a range from about 0.01% to about 2% by weight of the base blend of a cement mix.

According to yet another embodiment, zeolites are incorporated into a cement composition as an aqueous suspension, referred to herein as "aqueous zeolite suspensions" rather than as dry materials in a dry-mixed base blend. According to yet another embodiment, stable liquid additives comprising aqueous zeolite suspensions are prepared. Preferably, the aqueous zeolite suspension comprises from about 40 to about 60 weight percent zeolite. According to one embodiment, the zeolite used to prepare the aqueous suspensions comprises chabazite.

According to embodiments where the zeolite is provided as an aqueous suspension, the aqueous zeolite suspension enhances rheological and compressive strength properties similar to the enhancement that occurs when zeolite is dry-mixed into a base blend as described for other embodiments disclosed herein. Moreover, aqueous zeolite suspensions provide certain convenience, logistical and economic benefits compared to dry-blended zeolite compositions, making such aqueous zeolite suspensions preferable for some cementing applications.

According to yet another embodiment, aqueous zeolite suspensions may be used as a carrier for lightweight materials, such as hollow microspheres, gilsonite and perlite. Such lightweight materials typically have a specific gravity of 1.0 and less. In current cementing applications, lightweight materials may be dry-blended with cement and cement additives and then transported to location, where they are mixed with mixing fluids (such as water) to form low density cement compositions, typically having a density of 11.0 lb/gal or less. During blending and transportation, however, the lightweight additives tend to segregate from the rest of the dry-blend, in part due to their lower specific gravity with respect to the rest of the dry-blend. Segregation of the lightweight materials has adverse consequences for cement compositions being formed from that dry-blend. However, when the lightweight materials are added to an aqueous zeolite suspension to form a homogenous mixture, the aqueous zeolite suspension keeps the lightweight material in suspension. The aqueous zeolite-lightweight material suspension can be prepared at the location where the cementing application is to occur, or it can be transported to such a location without the risk of segregation of the lightweight materials during transport.

According to yet another embodiment, zeolite is incorporated into the base blend of cement mix from which a foam cement composition is prepared. The zeolite acts as a foam cement-stability agent. Conventional foam cements must be stabilized to keep gas entrained within the system. A conventional method for stabilizing foam cements is to add viscosifiers such as gel or microfine particles. According to this embodiment, a foam cement composition is prepared from a cement mix comprising a base blend comprising from about 1 to about 25 weight percent zeolite. The zeolite is effective in stabilizing foam cement compositions made from such cement mix.

According to yet another embodiment, zeolites are used to make low density foamed cement compositions. In order for conventional foam cements to achieve high compressive strengths, the base system (the unfoamed cement) must have a high compressive strength. Typically, this means that the base system has to be slightly densified. The higher density of the base system requires a higher foam quality (more air per volume of base system) in order to achieve the desired lower density for the foamed cement. However, the higher foam quality results in an increase in the permeability of the cement composition once it has set. According to this embodiment, incorporation of zeolite into the base system, where the zeolite is dry-mixed with the cement mix or is incorporated as an aqueous suspension, enables the use of a lower foam quality (less air per volume of base system) to produce lower density foamed cement. The zeolite enhances the compressive strength of the base system, and allows for a low density base system. In addition, because there is less air in the foamed cement composition, the permeability of the set cement is reduced.

Water in the cement compositions according to the present embodiments is present in an amount sufficient to make a slurry of the desired density from the cement mix, and that is pumpable for introduction down hole. The water used to form a slurry can be fresh water, unsaturated salt solution, including brines and seawater, and saturated salt solution. Generally, any type of water can be used, provided that it does not contain an excess of compounds that are well known to those skilled in the art to adversely affect properties of the cement composition. The water is present in an amount of about 22% to about 200% by weight of the base blend comprising a cement mix, and more preferably in an amount of about 40% to about 150% by weight of the base blend comprising a cement mix.

In carrying out methods of the present embodiment, a subterranean zone penetrated by a wellbore is sealed by placing a cement composition comprising zeolite, cementitious material and water into the subterranean zone and allowing the cement composition to set therein. Also, in carrying out the methods of the present embodiment, a cement composition of the present embodiment is prepared by mixing a cement mix comprising a base blend comprising zeolite and at least one cementitious material with a mixing fluid. The cement composition is then placed into a subterranean zone and allowed to set therein. In carrying out the methods of the present embodiment, a base blend comprising zeolite is prepared by mixing zeolite with at least one cementitious material. A base blend prepared according to the present embodiment is then used to form a cement composition in according with methods of the present embodiment.

In carrying out other methods of the present embodiment, a cement mix is prepared by mixing a base blend comprising at least one cementitious material with zeolite. The cement mix is mixed with a mixing fluid to form a cement composition according to the present embodiment, which is then placed into the subterranean zone and allowed to set therein, thus sealing the subterranean zone. In carrying out still other methods of the present embodiment, a cement mix is formed from a base blend comprising 100 weight percent of at least one cementitious material, and zeolite is mixed with the base blend as an additive.

According to still other methods of the present embodiment, a subterranean zone penetrated by a wellbore is sealed by placing a cement composition prepared with an aqueous zeolite suspension into the subterranean zone and allowing the cement composition to set therein. In carrying out methods of the present embodiment, a cement mix comprising a base blend is blended with an aqueous zeolite suspension to form a cement composition of the present embodiment. According to still other methods of the present embodiment, an aqueous zeolite suspension is prepared by mixing zeolite with a mixing fluid, and adding at least one lightweight material thereto. According to still other methods, a cement composition having a density less than about 12 lb/gal is prepared by blending an aqueous zeolite suspension comprising zeolite and at least one lightweight material with a cement mix.

According to still other methods of the present embodiment, a subterranean zone penetrated by a wellbore is sealed by placing a foamed cement composition according to the present embodiment into the subterranean zone and allowing the foamed cement composition to set therein. A foamed cement composition according to the present embodiment is prepared by foaming an unfoamed cement composition comprising zeolite.

In carrying out methods of the present embodiment, an unfoamed cement composition is prepared by mixing a cement mix comprising a base blend comprising zeolite and at least one cementitious material with a mixing fluid. According to other methods of the present embodiment, an aqueous zeolite suspension is mixed with the unfoamed cement composition formed from a base blend that may or may not comprise zeolite. According to still other methods, the foamed cement composition formed from an unfoamed cement composition is stabilized by one or more of zeolite in an aqueous zeolite suspension mixed with the unfoamed cement composition, or zeolite in the base blend of the unfoamed cement composition.

The zeolite used in carrying out any of the foregoing methods of the present embodiment can be as previously described herein. In preferred embodiments, the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite. Also, according to methods of the present embodiment, the zeolite used can be of a desirable particle size, for example, about 100 microns or less, or from about 3 microns to about 15 microns.

Also, according to any of the foregoing methods of the present embodiment, cement compositions, cement mixes and base blends are prepared that comprise additives known to those of ordinary skill in the art, including but not limited to fly ash, silica, lightweight additives, accelerating additives, retarders, fluid loss control additives, flow enhancing agents, and dispersants. Any such cement compositions, cement mixes, and base blends can be placed into a subterranean zone and allowed to set therein, thereby sealing the subterranean zone.

The following examples are illustrative of the methods and compositions discussed above.

EXAMPLE 1

Components in the amounts listed in TABLE 1 were added to form four batches of a normal density slurry. The batches were prepared according to API Specification RP 10B, 22$^{nd}$ Edition, 1997, of the American Petroleum Institute (the entire disclosure of which is hereby incorporated as if reproduced in its entirety).

Each batch was formed from a cement mix comprising a base blend comprising 100 weight percent Class A cement. Zeolite was added as an additive in the amount as indicated in Table 1, which is reported as a percent by weight of the base blend (% bwob). The water amounts are also reported as percentages based on the weight of the base blend. The density was conventionally measured, and reported in both metric units, kilogram per cubic meter ("kg/m$^3$") and imperial, pounds per gallon ("lb/gal").

Zeolite was obtained from C2C Zeolite Corporation, Calgary, Canada, and mined from Bowie, Ariz., USA. The specific zeolite material used was chabazite.

TABLE 1

| Components | Batch 1 | Batch 2 | Batch 3 | Batch 4 |
|---|---|---|---|---|
| Cement (%) | 100 | 100 | 100 | 100 |
| Zeolite (% bwob) | 0 | 10 | 0 | 10 |
| Water (% bwob) | 46.7 | 56.9 | 46.7 | 56.9 |
| Density kg/m$^3$ (lb/gal) | 1872 (15.6) | 1800 (15.0) | 1872 (15.6) | 1800 (15.0) |
| Compressive Strength Test Temperature °C. (°F.) | 4 (40) | 4 (40) | 16 (60) | 16 (60) |
| Compressive strength @ 12 hours: MPa (psi) | 1.31 (190) | 2.22 (322) | 3.83 (555) | 5.01 (726) |
| Compressive strength @ 24 hours: MPa (psi) | 2.07 (300) | 5.20 (753) | 10.00 (1450) | 10.40 (1507) |
| Compressive strength @ 48 hours: MPa (psi) | — | 10.72 (1554) | 17.25 (2500) | 17.94 (2600) |

The compressive strength data was determined by Non-Destructive Sonic Testing as set forth in API Specification 10B 22$^{nd}$ Edition, 1997, of the American Petroleum Institute, the entire disclosure of which is hereby incorporated herein by reference. TABLE 1 shows that batches with zeolite (Batches 2 and 4) had higher compressive strengths than conventional cement slurries (Batches 1 and 3) at the range of temperatures tested.

EXAMPLE 2

Components in the amounts listed in TABLE 2 were added to form four batches of a lightweight pozzolanic slurry. The batches were prepared according to API Specification RP 10B, 22$^{nd}$ Edition, 1997, of the American Petroleum Institute (the entire disclosure of which is hereby incorporated as if reproduced in its entirety).

Each batch was formed from a cement mix comprising a base blend comprising Class C cement, zeolite, fly ash and fumed silica in the amounts reported in Table 2, which are expressed as weight percent. Water was added to each base blend in the amount reported in Table 2, which is reported as a weight based on the weight of the base blend ("% bwob"). The density was conventionally measured, and reported in both metric units, kilogram per cubic meter ("kg/m$^3$") and imperial, pounds per gallon ("lb/gal").

Zeolite was obtained from C2C Zeolite Corporation, Calgary, Canada, and mined from Bowie, Ariz., USA. The specific zeolite material used was chabazite. Fumed silica was obtained from either Fritz Industries, Mesquite, Tex., USA, or Elkem Group, Oslo, Norway. The fly ash was Class F fly ash, commercially available from Halliburton Energy Services, Duncan, Okla.

TABLE 2

|  | Batch 1 | Batch 2 | Batch 3 | Batch 4 |
|---|---|---|---|---|
| Components |  |  |  |  |
| Cement (%) | 56 | 56 | 56 | 56 |
| Fly Ash (%) | 22 | 22 | 22 | 22 |
| Fumed silica (%) | 22 | 0 | 22 | 0 |
| Zeolite (%) | 0 | 22 | 0 | 22 |
| Water (% bwob) | 110 | 110 | 110 | 110 |
| Properties |  |  |  |  |
| Density $kg/m^3$ (lb/gal) | 1440 (12.0) | 1440 (12.0) | 1440 (12.0) | 1440 (12.0) |
| Compressive Strength Test Temperature ° C. (° F.) | 27 (80) | 27 (80) | 82 (180) | 80 (180) |
| Compressive strength @ 12 hours: MPa (psi) | 0.55 (79) | 0.42 (61) | 5.13 (743) | 4.86 (704) |
| Compressive strength @ 24 hours: MPa (psi) | 1.02 (148) | 0.92 (133) | 6.51 (944) | 6.21 (900) |
| Compressive strength @ 48 hours: MPa (psi) | 1.54 (223) | 1.52 (220) | 6.90 (1000) | 6.35 (921) |
| Compressive strength @ 72 hours: MPa (psi) | 2.03 (295) | 2.03 (295) | 6.90 (1000) | 6.35 (921) |
| Thickening Time (hr:min) | 5:20 | 4:03 | 5:43 | 4:15 |
| Plastic Viscosity (cP) | 41.4 | 49.9 | 16.9 | 18.3 |
| Yield point (lb/100 $ft^2$) | 23.6 | 25.3 | 12.3 | 10.3 |

The compressive strength data was determined by Non-Destructive Sonic Testing as set forth in API Specification 10B 22$^{nd}$ Edition, 1997, of the American Petroleum Institute, the entire disclosure of which is hereby incorporated herein by reference. TABLE 2 shows that batches with zeolite (Batches 2 and 4) are an acceptable substitute for conventional fumed silica cement slurries (Batches 1 and 3).

EXAMPLE 3

Components in the amounts listed in TABLE 3 were added to form five batches of a lightweight microsphere slurry. The batches were prepared according to API Specification RP 10B, 22$^{nd}$ Edition, 1997, of the American Petroleum Institute (the entire disclosure of which is hereby incorporated as if reproduced in its entirety).

Each batch was formed from a cement mix comprising a base blend comprising 100 weight percent Class C cement. Cenospheres (hollow ceramic microspheres) were added to each cement mix in an amount of 50% bwob, where % bwob indicates a percentage based on the weight of the base blend. Such cenospheres are available from PQ Corp., Chattanooga, Tenn., USA. The other additives, namely the zeolite and the fumed silica in this example, as well as the water amount, are reported as percentages based on the weight of the base blend ("% bwob"). The density was conventionally measured, and reported in both metric units, kilogram per cubic meter ("kg/m$^3$") and imperial, pounds per gallon ("lb/gal").

Zeolite was obtained from C2C Zeolite Corporation, Calgary, Canada, and mined from Bowie, Ariz., USA. The specific zeolite material used was chabazite. Fumed silica was obtained from either Fritz Industries, Mesquite, Tex., USA, or Elkem Group, Oslo, Norway.

TABLE 3

|  | Batch 1 | Batch 2 | Batch 3 | Batch 4 | Batch 5 |
|---|---|---|---|---|---|
| Water (% bwob) | 98 | 98 | 98 | 98 | 98 |
| Cement (%) | 100 | 100 | 100 | 100 | 100 |
| Fumed silica (% bwob) | 0 | 0 | 0 | 15 | 0 |
| Zeolite (% bwob) | 0 | 15 | 0 | 0 | 15 |
| Properties |  |  |  |  |  |
| Density kg/m$^3$ (lb/gal) | 1380 (11.5) | 1380 (11.5) | 1380 (11.5) | 1380 (11.5) | 1380 (11.5) |
| Compressive Strength Test Temperature ° C. (° F.) | 49 (120) | 49 (120) | 93 (200) | 93 (200) | 93 (200) |
| Compressive strength @ 24 hours: MPa (psi) | 7.64 (1107) | 7.66 (1110) | 8.29 (1202) | 15.35 (2225) | 14.00 (2026) |
| Compressive strength @ 48 hours: MPa (psi) | 11.18 (1621) | 11.96 (1734) | 13.39 (1940) | 18.41 (2669) | 15.70 (2276) |
| Compressive strength @ 72 hours: MPa (psi) | 13.40 (1942) | 13.40 (1942) | 12.34 (1789) | 18.81 (2726) | — |
| Comments | settling | no settling | settling | no settling | no settling |

The compressive strength data was determined by Non-Destructive Sonic Testing as set forth in API Specification 10B 22$^{nd}$ Edition, 1997, of the American Petroleum Institute, the entire disclosure of which is hereby incorporated herein by reference. TABLE 3 shows that batches with zeolite (Batches 2 and 5) did not settle, which demonstrates that zeolite performs as an anti-settling agent, and is comparable as an anti-settling agent to conventional fumed silica (Batch 4).

EXAMPLE 4

Components in the amounts listed in TABLE 4 were added to form three types of an 11.7 lb/gal density cement composition. The density was conventionally measured, and reported in both metric units, kilogram per cubic meter ("kg/m$^3$") and imperial, pounds per gallon ("lb/gal"). The cement compositions were prepared according to API Specification RP 10B, 22$^{nd}$ Edition, 1997, of the American Petroleum Institute (the entire disclosure of which is hereby incorporated as if reproduced in its entirety).

Type 1 was formed from a cement mix comprising a base blend comprising 100 weight percent Class C cement. The water amount used to form the Type 1 cement composition is also reported as a percentage based on the weight of the base blend. Prehydrated bentonite in the amount as reported in Table 4 was added to the water used to form the cement composition, and is reported in Table 4 as a percentage based on the weight of the base blend ("% bwob"). Prehydrated bentonite, can be obtained under the trademark "AQUA GEL GOLD" from Halliburton Energy Services, Inc., Houston, Tex. USA.

Type 2 was formed from a cement mix that comprised a base blend comprising 60 weight percent Class C cement, 5 weight percent accelerating additive (which itself is comprised of 1 weight percent sodium meta silicate; 2 weight percent sodium sulfate; 2 weight percent calcium chloride), 15 weight percent fumed silica, 1 weight percent prehydrated bentonite, and 19 weight percent fly ash. Fly ash was obtained from Ashcor Technologies, Calgary, Alberta, Canada (samples obtained at Sheerness and Battle River). Fumed silica was obtained from either Fritz Industries, Mesquite, Tex., USA, or Elkem Group, Oslo, Norway. The water amount for Type 2 is reported as a percentage based on the weight of the base blend ("% bwob") of the cement mix. As with Type 1, the prehydrated bentonite used for Type 2 was added to the water as a percentage based on the weight of the base blend ("% bwob"). Prehydrated bentonite, can be obtained under the trademark "AQUA GEL GOLD" from Halliburton Energy Services, Inc., Houston, Tex. USA.

Type 3 was formed from a cement mix that comprised a base blend comprising 60 weight percent Class C cement, 30 weight percent zeolite (mesh size 1), and 10 weight percent (mesh size 2) zeolite. The zeolite was clinoptilolite obtained from C2C Zeolite Corporation, Calgary, Canada, and was further divided by particle size, i.e., its ability to pass through conventional mesh screens sizes 1 and 2. The water amount for Type 3 is reported as a percentage based on the weight of the base blend ("% bwob") of the cement mix.

TABLE 4

|  | Type 1 | Type 2 | Type 3 |
| --- | --- | --- | --- |
| Components |  |  |  |
| Cement % | 100% | 60% | 60% |
| Zeolite (mesh size 1) % | 0 | 0 | 30% |
| Zeolite (mesh size 2) % | 0 | 0 | 10% |
| Prehydrated bentonite | 4% bwob | 1% | 0 |
| Fly ash | 0 | 19% | 0 |
| Fumed silica | 0 | 15% | 0 |
| Accelerating additives |  | 5% |  |
| Water | 154% bwob | 114% bwob | 130% bwob |
| Properties |  |  |  |
| Density kg/m$^3$ (lb/gal) | 1400 (11.7) | 1400 (11.7) | 1400 (11.7) |
| Time to 0.35 MPa (50 psi) at 20° C. (68° F.) (hr:min) | no set | 4:43 | 9:21 |
| Time to 0.35 MPa (50 psi) at 30° C. (86° F.) (hr:min) | no set | 3:16 | — |
| Time to 0.35 MPa (50 psi) at 40° C. (104° F.)(hr:min) | 21:31 | 3:36 | 4:13 |
| Time to 0.35 MPa (50 psi) at 50° C. (122° F.) (hr:min) | 8:12 | — | 1:45 |
| Time to 3.5 MPa (500 psi) at 20° C. (68° F.) (hr:min) | N/A | 52:14 | 52:30 |
| Time to 3.5 MPa (500 psi) at 30° C. (86° F.) (hr:min) | N/A | 22:57 | 19:10 |
| Time to 3.5 MPa (500 psi) at 40° C. (104° F.) (hr:min) | N/A | 16:05 | 16:45 |
| Time to 3.5 MPa (500 psi) at 50° C. (122° F.) (hr:min) | N/A | — | 11:07 |

TABLE 4 shows that the zeolite cement composition (Type 3) sets faster than the conventional bentonite cement composition (Type 1) even at low temperatures, and delivers results similar to conventional fumed silica compositions (Type 2).

EXAMPLE 5

Components in the amounts listed in TABLE 5 were added to form five batches of an 11.7 lb/gal density cement composition. The density was conventionally measured, and reported in both metric units, kilogram per cubic meter ("kg/m$^3$") and imperial, pounds per gallon ("lb/gal"). The batches were prepared according to API Specification RP 10B, 22$^{nd}$ Edition, 1997, of the American Petroleum Institute (the entire disclosure of which is hereby incorporated as if reproduced in its entirety).

Each batch was formed from a cement mix that comprised a base blend comprising 60 weight percent Class C cement, 30 weight percent zeolite (mesh size 1), and 10 weight percent (mesh size 2). The zeolite was clinoptilolite obtained from C2C Zeolite Corporation, Calgary, Canada, and was further divided by particle size, i.e., its ability to pass through conventional mesh screens sizes 1 and 2.

The accelerating additive for Batch 2 was calcium sulfate, the accelerating additive for Batch 3 was sodium aluminate, and the accelerating additive for Batches 4 and 5 was sodium sulfate. The amounts of accelerating additive are reported as percentages based on the weight of the base blend ("% bwob") of the cement mix. The water amounts for each batch are also reported as percentages based on the weight of the base blend ("% bwob") of the cement mix.

an additive. The specific zeolite material used was chabazite, which was obtained from C2C Zeolite Corporation, Calgary, Canada. A dispersant was also mixed with the cement mix as an additive in the amount as reported in Table 6, which is reported as a percentage based on the weight of the base blend (% bwob). The specific dispersant used was a sulfonated ketone acyclic aldehyde condensate available from Halliburton Energy Services. The water amounts for each

TABLE 5

| Components | Batch 1 | Batch 2 | Batch 3 | Batch 4 | Batch 5 |
|---|---|---|---|---|---|
| Cement % | 60 | 60 | 60 | 60 | 60 |
| Zeolite (mesh size 1) % | 30 | 30 | 30 | 30 | 30 |
| Zeolite (mesh size 2) % | 10 | 10 | 10 | 10 | 10 |
| Accelerating additive % bwob | 0 | 3 | 3 | 3 | 6 |
| Water % bwob | 130 | 130 | 130 | 130 | 130 |
| Density kg/m$^3$ (lb/gal) | 1400 (11.7) | 1400 (11.7) | 1400 (11.7) | 1400 (11.7) | 1400 (11.7) |
| Temperature ° C. (° F.) | 50 (122) | 50 (122) | 50 (122) | 50 (122) | 50 (122) |
| Compressive strength @ 12 hours: MPa (psi) | 0 (1) | 2.39 (347) | 1.78 (258) | 1.35 (196) | 2.46 (356) |
| Compressive strength @ 24 hours: MPa (psi) | 0.72 (104) | 2.45 (355) | 3.66 (531) | 2.48 (360) | 5.14 (745) |
| Compressive strength @ 48 hours: MPa (psi) | 2.76 (400) | 5.16 (748) | 6.23 (903) | 4.74 (687) | 5.84 (847) | batch are reported as percentages based on the weight of the base blend.

Fluid loss was tested under standard conditions according to Section 10 of API Specification RP 10B, 22$^{nd}$ Edition, 1997, of the American Petroleum Institute (the entire disclosure of which is hereby incorporated as if reproduced in its entirety).

TABLE 6

| Components | Batch 1 | Batch 2 | Batch 3 | Batch 4 | Batch 5 | Batch 6 | Batch 7 | Batch 8 | Batch 9 |
|---|---|---|---|---|---|---|---|---|---|
| Cement % | 100 | 100 | 100 | 100 | 100 | 100 | 100 | 100 | 100 |
| Zeolite % bwob | 0 | 5 | 10 | 0 | 5 | 10 | 0 | 5 | 10 |
| Dispersant % bwob | 0 | 0 | 0 | 1 | 1 | 1 | 1.5 | 1.5 | 1.5 |
| Water % bwob | 46.6 | 47.8 | 49 | 46.0 | 47.8 | 49 | 45.8 | 47.8 | 49 |
| Density kg/m$^3$ (lb/gal) | 1872 (15.6) | 1872 (15.6) | 1872 (15.6) | 1872 (15.6) | 1872 (15.6) | 1872 (15.6) | 1872 (15.6) | 1872 (15.6) | 1872 (15.6) |
| Fluid loss at 80° F. (cc/30 min) | 612 | 515 | 417 | 261 | 190 | 139 | 164 | 136 | 89 |
| Fluid loss at 150° F. (cc/30 min) | 590 | 482 | 417 | 328 | 110 | 91 | 287 | 120 | 69 |

TABLE 5 shows that cement compositions containing zeolite set with conventional accelerating additives, as illustrated by the increase in compressive strengths over time.

EXAMPLE 6

Components in the amounts listed in TABLE 6 were added to form five batches of a 15.6 lb/gal cement composition. The density was conventionally measured, and reported in both metric units, kilogram per cubic meter ("kg/m$^3$") and imperial, pounds per gallon ("lb/gal"). The batches were prepared according to API Specification RP 10B, 22$^{nd}$ Edition, 1997, of the American Petroleum Institute (the entire disclosure of which is hereby incorporated as if reproduced in its entirety).

Each batch was formed from a cement mix comprising a base blend comprising 100 weight percent Class A cement. Zeolite in the amount reported in Table 6, which is a percentage based on the weight of the base blend of the cement mix ("% bwob"), was mixed with the cement mix as TABLE 6 shows that cement compositions comprising zeolite (Batches 2, 3, 5, 6, 8, and 9) control fluid loss better than conventional cement compositions. Also, the fluid loss control improves with increasing concentration of the dispersant.

EXAMPLE 7

Components in the amounts listed in TABLE 7 were added to form seven batches of a lightweight pozzolanic cement composition. The initial density was conventionally measured, and reported in both metric units, kilogram per cubic meter ("kg/m$^3$") and imperial, pounds per gallon ("lb/gal"). The batches were prepared according to API Specification RP 10B, 22$^{nd}$ Edition, 1997, of the American Petroleum Institute (the entire disclosure of which is hereby incorporated as if reproduced in its entirety).

Batches 1, 3, and 6 were formed from a cement mix that comprised a base blend comprising 56 weight percent Class A C cement, 22 weight percent fly ash, and 22 weight percent fumed silica. The fly ash was Class F fly ash, commercially available from Halliburton Energy Services. Fumed silica was obtained from either Fritz Industries, Mesquite, Tex., USA, or Elkem Group, Oslo, Norway.

Batches 2, 4, and 7 were formed from a cement mix that comprised a base blend comprising 56 weight percent Class C cement, 22 weight percent fly ash, and 22 weight percent zeolite. The fly ash was Class F fly ash, commercially available from Halliburton Energy Services. The specific zeolite material used was chabazite, which was obtained from C2C Zeolite Corporation, Calgary, Canada.

Batch 5 was formed from a cement mix that comprised a base blend comprising 100 weight percent Class C cement.

Water was added to each cement mix to form a cement composition. The water amounts for each of the seven batches are reported in Table 7 as percentages based on the weight of the base blend ("% bwob") of each cement mix.

Under standard conditions set out in Section 15.6, Sedimentation Test, of API Specification RP 10B, 22$^{nd}$ Edition, 1997, of the American Petroleum Institute, the batches were placed in corresponding cylinders and allowed to set for 24 hours. Each cylinder was then divided into segments, and the density for each segment was determined by conventional means. It is understood that the absence of settling is indicated by minimal variation in density values among the sections of a given cylinder, as shown in Table 7.

10B, 22$^{nd}$ Edition, 1997, of the American Petroleum Institute (the entire disclosure of which is hereby incorporated as if reproduced in its entirety). Following said API specification, a cement mix comprised of a base blend comprising 60 weight percent Class C cement and 40 weight percent zeolite was formed by dry-mixing the cement and the zeolite by hand in a glass jar. Clinoptilolite, which is commercially available from C2C Zeolite Corporation of Calgary, Canada, was used as the zeolite for each base blend.

Sodium sulfate and sodium carbonate in the amounts listed in TABLE 8 were dry-mixed into the cement mix to act as accelerating additives. The sodium sulfate and sodium carbonate amounts are reported as percentages of the weight of the base blend (% bwob) of each cement mix.

The cement-zeolite base blend and the accelerating additives comprised the cement mix from which a cement composition was formed. The cement composition was formed by adding the cement mix to mixing fluid being

TABLE 7

|  | Batch 1 | Batch 2 | Batch 3 | Batch 4 | Batch 5 | Batch 6 | Batch 7 |
|---|---|---|---|---|---|---|---|
| Components |  |  |  |  |  |  |  |
| Cement % | 56 | 56 | 56 | 56 | 100 | 56 | 56 |
| Fly ash % | 22 | 22 | 22 | 22 | 0 | 22 | 22 |
| Fumed silica % | 22 | 0 | 22 | 0 | 0 | 22 | 0 |
| Zeolite % | 0 | 22 | 0 | 22 | 0 | 0 | 22 |
| Water (% bwob) | 110 | 110 | 110 | 110 | 110 | 110 | 110 |
| Initial density kg/m$^3$ (lb/gal) | 1440 (12.0) | 1440 (12.0) | 1440 (12.0) | 1440 (12.0) | 1440 (12.0) | 1440 (12.0) | 1440 (12.0) |
| Temperature ° C. (° F.) | 27 (80) | 27 (80) | 82 (180) | 82 (180) | 93 (200) | 93 (200) | 93 (200) |
| Settling Data |  |  |  |  |  |  |  |
| Top Segment MPa (lb/gal) | 1392 (11.6) | 1476 (12.3) | 1404 (11.7) | 1488 (12.4) | 1524 (12.7) | 1476 (12.3) | 1548 (12.9) |
| 2nd Segment MPa (lb/gal) | 1440 (12.0) | 1488 (12.4) | 1404 (11.7) | 1500 (12.5) | — | — | — |
| 3rd Segment MPa (lb/gal) | 1440 (12.0) | 1488 (12.4) | 1404 (11.7) | 1488 (12.4) | 1596 (13.3) | 1476 (12.3) | 1536 (12.8) |
| 4th Segment MPa (lb/gal) | 1428 (11.9) | 1488 (12.4) | — | 1476 (12.3) | — | — | — |
| Bottom Segment MPa (lb/gal) | 1428 (11.9) | 1488 (12.4) | 1416 (11.8) | 1476 (12.3) | 1572 (13.1) | 1452 (12.1) | 1548 (12.9) |
| Comments | settling | no settling | no settling | no settling | settling | no settling | no settling |

TABLE 7 shows that batches with zeolite (Batches 2, 4, and 7) did not settle.

EXAMPLE 8

To illustrate the effectiveness of accelerating agents with cement compositions comprising zeolites, ten cement compositions, each having a density of about 1400 kg/m$^3$ (11.68 lb/gal), were prepared according to API Specification RP maintained in a blender at 4000 RPM. All of the cement mix was added to the mixing fluid over a 15 second period. A cover was then placed on the blender, and mixing was continued at about 12,000 RPM for about 35 seconds. For each of the ten cement compositions, the mixing fluid was water, in an amount of 135% bwob, which indicates a percentage based on total weight of the base blend of the cement mix. The cement mix temperature and mixing fluid temperature were both 24° C. (75° F.).

TABLE 8

| | | | Compressive strength at 30° C. (86° F.) | | | | |
|---|---|---|---|---|---|---|---|
| Comp. No. | Na$_2$SO$_4$ (% bwob) | Na$_2$CO$_3$ (% bwob) | Time (Hr:Min) to 0.35 MPa (50 psi) | Time (Hr:Min) to 3.5 MPa (500 psi) | MPa (psi) at 12 Hrs | MPa (psi) at 24 Hrs | MPa (psi) at 48 Hrs |
| 1 | 6.00 | 0.0 | 6:12 | 46:11 | 1.09 (158) | 2.37 (343) | 3.73 (541) |
| 2 | 7.00 | 0.0 | 7:17 | 39:04 | 0.88 (128) | 2.19 (317) | 4.14 (600) |
| 3 | 6.95 | 0.05 | 6:49 | 42:41 | 1.01 (146) | 2.32 (336) | 4.29 (622) |
| 4 | 6.90 | 0.10 | 7:13 | 36:18 | 0.88 (128) | 2.28 (330) | 4.44 (643) |
| 5 | 6.75 | 0.25 | 2:45 | 31:31 | 1.03 (149) | 2.41 (349) | 4.55 (659) |
| 6 | 6.50 | 0.50 | 7:20 | 34:03 | 1.01 (146) | 2.48 (359) | 4.49 (651) |
| 7 | 6.00 | 1.00 | 6:27 | 32:42 | 1.22 (177) | 2.60 (377) | 4.62 (670) |
| 8 | 6.00 | *1.00 | 4:03 | 33:38 | 1.42 (206) | 2.64 (383) | 4.62 (670) |
| 9 | 6.50 | **0.5 | — | 29:53 | 1.65 (239) | 2.94 (426) | 4.76 (690) |
| 10 | 6.00 | **1.0 | 6:57 | 31:33 | 1.21 (175) | 2.83 (410) | 4.97 (720) |

*hand-ground in an agate mortar
**laboratory grade from Baker chemicals

The time it takes for a cement composition to reach a designated MPa (psi) value is a measurement of the effectiveness of the accelerating additive. Table 8 illustrates that sodium sulfate, sodium carbonate, and a combination of sodium sulfate and sodium carbonate are effective accelerators for cement compositions comprising zeolite.

The 0.35 MPa and 3.5 MPa values were selected as general testing points. These general testing points are based on the fact that one of ordinary skill in the art would consider that at 0.35 MPa, a cement composition is beginning to set, while at 3.5 MPa, the cement composition has enough strength to hold the casing pipe in place. With respect to measuring compressive strength at 12, 24, and 48 hours, these values were also selected as arbitrary standards within the industry as a means for providing comparable data points. It is understood that compressive strength could be measured at other values of MPa and at other elapsed times. It may be desirable to do so when industry standards require that a certain MPa value be achieved in a certain amount of time. For example, EUB in Alberta Canada requires a compressive strength of 3.5 MPa in 48 hours.

Although the embodiment exemplified by Example 8 has been described with reference to sodium carbonate and sodium sulfate as accelerators, other accelerators, such as calcium sulfate and potassium sulfate, which are referred to herein as sulfate salts, and calcium carbonate and potassium carbonate, which are referred to herein as carbonate salts, would also achieve the illustrated effectiveness. Accordingly, when a combination of accelerators is used, it will be understood by those of ordinary skill in the art that a number of combinations comprising any of the sulfate salts with any of the carbonate salts can be used.

EXAMPLE 9

Table 9A illustrates fluid loss control additives that are effective in cement compositions containing zeolite. Twelve cement compositions, each having a density of about 1400 kg/m$^3$ (11.68 lb/gal), were prepared according to API Specification RP10B, 22$^{nd}$ edition, 1997, of the American Petroleum Institute, the entire disclosure of which is incorporated herein by reference. According to this API specification, a cement mix comprised of a base blend comprising 60 weight percent Class C cement and 40 weight percent zeolite was formed by dry-mixing the cement and the zeolite by hand in a glass jar. Clinoptilolite, which is commercially available from C2C Zeolite Corporation of Calgary, Canada, was used as the zeolite in each base blend.

Sodium sulfate in an amount of 7% bwob, which indicates a percentage by weight of the base blend, was dry-mixed into each cement mix as an accelerating additive. Fluid loss additives (FLAs) as listed in Table 9A were also dry-mixed into the cement mix in the amount as listed, which is also reported as a percentage by weight of the base blend.

The cement-zeolite base blend and the accelerating and fluid loss additives comprised the cement mix from which a cement composition was formed. The cement composition was formed by adding the cement mix to a mixing fluid being maintained in a blender at 4000 RPM. The cement mix was added to the mixing fluid over a 15 second period. When all of the cement mix was added to the mixing fluid, a cover was placed on the blender and mixing was continued at about 12,000 RPM for about 35 seconds. For each cement composition, the mixing fluid was water. The amount of water required in the blender was 135% bwob, which indicates a percentage based on total weight of the base blend of the cement mix. The cement mix temperature and mixing fluid temperature were both 24° C. (75° F.).

TABLE 9A

| Comp. No. | Fluid Loss Additive ("FLA") | FLA Charge Character | FLA Concentration (% bwob) | Other Additive and Concentration of Other Additive (% bwob) | API Fluid Loss (mL/30 min) |
|---|---|---|---|---|---|
| 1 | none | N/A | N/A | none | 787 |
| 2 | HEC (hydroxyethylcellulose) | non-ionic | 1.0 | none | 54 |
| 3 | hydrophobically modified HEC (Natrosol Plus 330 ™) | non-ionic | 1.0 | none | 70 |
| 4 | hydrophobically modified HEC (Natrosol Plus 330 ™) | non-ionic | 0.75 | none | 140 |

TABLE 9A-continued

| Comp. No. | Fluid Loss Additive ("FLA") | FLA Charge Character | FLA Concentration (% bwob) | Other Additive and Concentration of Other Additive (% bwob) | API Fluid Loss (mL/30 min) |
|---|---|---|---|---|---|
| 5 | hydrophobically modified HEC (Natrosol Plus 330 ™) | non-ionic | 0.5 | none | 321 |
| 6 | CMHEC (carboxymethyl hydroxyethylcellulose) | anionic | 1.0 | none | 274 |
| 7 | Guar | anionic | 1.0 | none | 736 |
| 8 | Modified Guar | anionic | 1.0 | none | 660 |
| 9 | LAP-1 | non-ionic | 1.0 | Bentonite 1.0 | 372 |
| 10 | Halad 344 | anionic | 1.0 | none | 248 |
| 11 | Halad 413 | anionic | 1.0 | none | 150 |
| 12 | Starch | non-ionic | 1.0 | none | 431 |

HEC (Comp. No. 2) is commercially available from Dow/Union Carbide of Midland, Mich. Hydrophobically modified HEC (Comp. Nos. 3-5) is commercially available as Natrosol Plus 330™ from the Aqualon Division (Kennedy, Tex.) of Hercules Incorporated. CMHEC (Comp. No. 6) is commercially available from Drilling Specialties Company (Houston, Tex.), a division of Chevron Philips Chemical. Guar (Comp. No. 7) and modified guar (Comp. No. 8) are commercially available from Rhone-Poulenc. LAP-1 and bentonite (Comp. No. 9) are a polyvinyl alcohol and a montmorillonite clay respectively, and are each commercially available from Halliburton Energy Services, Duncan, Okla. Halad 344 (Comp. No. 10) are grafted polymers prepared by the polymerization of monomers or salts of monomers of N,N-dimethylacrylamide, 2-acrylamido-2-methylpropanesulfonic acid and acrylonitrile having a lignin or lignite or other backbone, and are commercially available from Halliburton Energy Services, Duncan, Okla. Halad 413 (Comp. No. 11) are copolymers or salts of copolymers of N,N-dimethylacrylamide (NNDMA) and 2-acrylamido, 2-methyl propane sulfonic acid (AMPS), and are commercially available from Halliburton Energy Services.

Fluid loss was tested by following procedures set forth in Section 10 of API Recommended Practice 10B, 22$^{nd}$ Edition, 1997, of the American Petroleum Institute (the entire disclosure of which is hereby incorporated as if reproduced in its entirety).

The procedures followed were those for testing at temperatures less than 194° F., with atmospheric pressure conditioning, and a static fluid loss cell. Generally, however, 475 cc of each composition was placed into the container of an atmospheric pressure consistometer commercially available from Howco. The composition was cooled to the test temperature of 20° C. (68° F.) over a 5 minute period, where the temperature of the atmospheric consistometer was controlled by the temperature of a bath. The test temperature of 20° C. (68° F.) was an arbitrarily chosen value based on typical values for bottom hole circulating temperature (BHCT) of a well. After 20 minutes, the composition was stirred, and then the fluid loss cell was filled.

A 5 inch standard fluid loss cell was prepared according to the aforementioned Section 10 of API Recommended Practice 10B. Generally, however, the test was started within 30 seconds of closing the cell by application of nitrogen applied through the top valve. Filtrate was collected and the volume and time were recorded if blow out occurred in less than 30 minutes or volume recorded at 30 minutes if no blow out occurred. Thus, to report fluid loss data indicated in Table 9A, values were calculated as twice the volume of filtrate multiplied by 5.477 and divided by the square root of time if blowout occurred, and as twice the volume of filtrate if blowout did not occur within 30 minutes.

Lower amounts (mL/30 Min) of fluid loss as compared to the fluid loss amount of Comp. No. 1 illustrate the effectiveness of the FLAs in those cement compositions. Thus, fluid loss control additives that are effective on cement compositions comprising zeolite are illustrated. Of the twelve cement compositions tested, the non-ionic hydroxyethyl cellulose (HEC) (Comp. No. 2), and hydrophobically modified HEC (Comp. Nos. 3-5) provided the best fluid loss control. The anionic CMHEC (Comp. No. 6), Halad 413 (Comp. No. 11), Halad 344 (Comp. No. 10), non-ionic starch (Comp. No. 12), and LAP-1/Bentonite mix (Comp No. 9) provided fluid loss control to a lesser degree. Guar, (Comp No. 7) and modified guar (Comp No. 8) provided only a small degree of fluid loss control.

Additional fluid loss control testing was conducted on cement compositions comprising non-ionic hydrophobically modified HEC (Natrosol Plus 330™). API fluid testing was conducted on the cement compositions listed in Table 9B at the indicated temperatures. The cement compositions listed in Table 9B were prepared in the same manner as described above for the compositions listed in Table 9A. As described above, base blends comprising 60 weight percent Class C cement and 40 weight percent zeolite were dry-mixed by hand in a glass jar. Clinoptilolite, which is commercially available from C2C Zeolite Corporation of Calgary, Canada, was used as the zeolite in each base blend.

Sodium sulfate in an amount of 7% bwob (where "% bwob" indicates a percentage by weight of the base blend) was dry-mixed with each base blend as an accelerating additive. The non-ionic hydrophobically modified HEC (Natrosol Plus 330™) FLA was also dry-mixed into each base blend in the % bwob as listed in Table 9B.

The cement-zeolite base blend and the accelerating and fluid loss additives comprised the cement mix from which a cement composition was formed. The cement composition was formed by adding the cement mix to a mixing fluid being maintained in a blender at 4000 RPM. All of the cement mix was added to the mixing fluid over a 15 second period. A cover was then placed on the blender and mixing was continued at about 12,000 RPM for about 35 seconds. For each cement composition, the mixing fluid was water, which was present in an amount of about 135% bwob, which is a percentage based on weight of the base blend. The density of each cement composition was about 1400 kg/m$^3$ (11.68 lb/gal).

Fluid loss testing according to API procedure Section 10 of API Recommended Practice 10B as described above was conducted at the test temperatures indicated in Table 9B. The measured fluid loss values (mL of fluid lost/30 min) illustrate that non-ionic hydrophobically modified HEC is an effective fluid loss control agent for use with cement compositions containing zeolite at temperatures at least up to 80° C. (176° F.).

recorded when the material in the flask first began to unpack, which is indicated below in Table 10 as the initial slough-off. The number on the counter was again recorded when all of the material in the flask had unpacked, which is indicated in Table 10 as the complete slough-off.

TABLE 9B

| Comp. No. | Fluid Loss Additive ("FLA") | FLA Charge Character | FLA Concentration (% bwob) | API Fluid Loss Test Temperature ° C. (° F.) | API Fluid Loss (mL/30 min) |
|---|---|---|---|---|---|
| 1 | hydrophobically modified HEC (Natrosol Plus 330 ™) | non-ionic | 0.75 | 30 (86) | 183 |
| 2 | hydrophobically modified HEC (Natrosol Plus 330 ™) | non-ionic | 0.75 | 40 (104) | 399 |
| 3 | hydrophobically modified HEC (Natrosol Plus 330 ™) | non-ionic | 1.0 | 40 (104) | 75 |
| 4 | hydrophobically modified HEC (Natrosol Plus 330 ™) | non-ionic | 0.75 | 50 (122) | 427 |
| 5 | hydrophobically modified HEC (Natrosol Plus 330 ™) | non-ionic | 1.0 | 50 (122) | 272 |
| 6 | hydrophobically modified HEC (Natrosol Plus 330 ™) | non-ionic | 0.75 | 80 (176) | 804 |

EXAMPLE 10

Table 10 illustrates that zeolite is an effective flow enhancing agent. Flow enhancing agents relate to the flow properties of a dry cement mix. Thus, eight cement mixes comprising eight base blends were prepared by dry-mixing Class C cement and zeolite in the amounts as listed in Table 10 by hand in a glass jar. Chabazite, which is commercially available from C2C Zeolite Corporation of Calgary, Canada, was used as the zeolite for each base blend.

The base blend for cement mix nos. 7 and 8 comprised zeolite (chabazite) with acetic acid, a conventional flow enhancing agent, adsorbed thereon in the amount as indicated, where "% bwoZ" is a percentage based on the weight of the zeolite. To absorb the acetic acid on the zeolite, 10 g of zeolite was weighed into a beaker. The required percentage by weight of acetic acid was added by dropper. The zeolite and acetic acid were then mixed with a spatula to give a homogenous powder with adsorbed acetic acid.

A pack set test method was used to obtain an indication of the flow properties of the eight dry cement mixes. The pack set test is empirical, as there is no direct correlation with the flow properties of the powder. However, it is understood by one of ordinary skill in the art that dry-mixes with a pack set index of about 10 or less will typically flow efficiently in field applications.

The pack set test was conducted as follows for each cement mix. First, at least 400 grams of the base blend of each cement mix was isolated by placing it into a glass jar with a lid. An amount of each base blend was weighed into a 250 mL Erlenmeyer flask to obtain approximately 100 cc volume in the flask. The flask was then stoppered with a rubber stopper, and placed on a vibrating table. Using a variable transformer, the flask was vibrated at a dial reading of 48 for a time period of 24 seconds. The flask was then placed between the four rubber projections of a Roto-Tester, which is a device commercially available from W.R. Grace. The counter of the Roto-Tester was set to zero and then the Roto-Tester was turned on. The number on the counter was

TABLE 10

| Mix No. | Weight Percent API Class C Portland Cement. | Weight Percent Zeolite (chabazite) | Number of Revolutions- Initial Slough-Off | Number of Revolutions- Complete Slough-Off |
|---|---|---|---|---|
| 1 | 100 | 0 | 12.7 | 14.7 |
| 2 | 99 | 1 | 11.5 | 13.0 |
| 3 | 95 | 5 | 7.3 | 8.3 |
| 4 | 90 | 10 | 8.4 | 9.4 |
| 5 | 85 | 15 | 4.7 | 5.7 |
| 6 | 65 | 35 | 4.0 | 5.0 |
| 7 | 99.5 | 0.5 with 25% bwoZ acetic acid | 3.4 | 4.6 |
| 8 | 99 | 1 with 15% bwoZ acetic acid | 4.0 | 5.2 |

The slough-off values in Table 10 indicate that cement compositions formed from cement mixes comprising base blends comprising zeolite will flow efficiently when used in field applications. In addition, these values indicate that the zeolite also behaves as friction reducer. Friction reduction and flow enhancement are considered to be similar properties.

EXAMPLE 11

Tables 11A and 11B illustrate that cement mixes comprising zeolite as a part of the base blend are useful in forming cement compositions having good compressive strength, which may also be considered "lightweight" cements, as densities equal to or less than about 13.5 lb/gal can be achieved.

Six cement compositions, each having a density as indicated in Table 11A were prepared according to API Specification RP 10B, $22^{nd}$ Edition, 1997, of the American Petroleum Institute (the entire disclosure of which is hereby incorporated as if reproduced in its entirety). The density was conventionally measured, and reported in both metric units, kilogram per cubic meter ("$kg/m^3$") and imperial, pounds per gallon ("lb/gal").

Composition Nos. 1 and 4 were formed from a cement mix comprising a base blend comprising 100 weight percent Class G cement. The cement mix was mixed with a mixing fluid comprising water and prehydrated bentonite in the amounts reported in Table 11A, where the water amount is reported as a percentage by weight of the base blend of the cement mix, and the prehydrated bentonite is reported as a percentage by weight of the amount of mixing fluid (water). Prehydrated bentonite is bentonite that is mixed in water and added to the mixing fluid as a liquid, where 1% of prehydrated bentonite is equivalent to 4-5% dry blended bentonite. Bentonite is a montmorillonite clay commercially available from Halliburton Energy Services, Duncan, Okla.

Composition Nos. 2, 3, 5 and 6 were each formed from a cement mix comprising a base blend comprised of Class G cement and zeolite in the amounts (weight percents) reported in Table 11A. The cement and the zeolite were dry-mixed by hand in a glass jar. Chabazite, which is commercially available from C2C Zeolite Corporation of Calgary, Canada, was used as the zeolite for each cement composition. CFR-3 was also dry-mixed by hand in the glass jar with the base blend in the amount as listed in Table 11A, where % bwob indicates a percentage by weight of the base blend. CFR-3 is the tradename for the condensation product of formaldehyde, acetone and a sulfite, which is commercially available from Halliburton Energy Services.

The cement-zeolite base blend and the CFR-3 dispersant comprised the cement mix from which a cement composition was formed. The cement composition was formed by adding the cement mix to mixing fluid being maintained in a blender at 4000 RPM. The cement mix was added to a mixing fluid over a 15 second period. When all of the cement mix was added to the mixing fluid, a cover was placed on the blender and mixing was continued at about 12,000 RPM for about 35 seconds. For cement composition Nos. 2, 3, 5 and 6, the mixing fluid comprised water in the amount as listed in Table 11A where % bwob indicates a percent by weight of the base blend. The temperatures of the cement mix and the mixing fluid were each 24° C. (75° F.).

The six cement compositions were then tested, which yielded the rheology, compressive strength, free water, and settling data as indicated in Table 11B.

The viscosity (dial reading) of the cement compositions was measured using a Fann Model 35 viscometer, and reported in the Rheology Results in Table 11B. The viscosity was taken as the measurement of the dial reading on the Fann Model 35 at the different rotational speeds as indicated in 600 to 3 RPM, and at the temperature as indicated in Table 11B. For example, the Fann Viscometer is rotated at 300 RPM (revolutions per minute) for 60 seconds and a value on the dial is read, the speed is then changed to 200 RPM and the new value on the dial reading taken. There are a number of theoretical models known to those of ordinary skill in the art that can be used to convert the values from the dial readings at the different RPM's into viscosity (centipoises). In addition, different viscometer models use different RPM values, thus, in some instances, a measurement is not available at a particular RPM value.

The Rheology Results were obtained generally according to the procedures set forth in Section 12 of the API Specification RP 10B, 22$^{nd}$ Edition, 1997, of the American Petroleum Institute (the entire disclosure of which is hereby incorporated as if reproduced in its entirety). The aforementioned API procedures were modified in that the initial reading at 300 RPM was taken after 60 seconds of continuous rotation at that speed. Dial readings at 200, 100, 60, 30, 6 and 3 were then recorded in descending order at 20-second intervals. The final reading at 600 RPM was taken after 60 seconds of continuous rotation at that speed.

Free water data was gathered according to Section 15.5 of Addendum 2 of the API Specification 10B 22$^{nd}$ Edition, 1997, of the American Petroleum Institute, the entire disclosure of which is hereby incorporated herein by reference. Generally according to said API Specification, 250 ml of each cement composition was poured into its own 250 ml graduated glass cylinder and then sealed with a plastic film wrap to prevent evaporation. A two hour test period was then initiated, in which the graduated cylinders were left standing. After two hours, the free fluid that had gathered on top of each cement composition inside the cylinder was measured. The percent of free fluid was calculated as the measured milliliters of free fluid multiplied by 100 and then divided by the initial 250 milliliters of the cement composition.

Settling data is based on observation of the degree of sample settling in the free water tests.

TABLE 11A

| Components | No. 1 | No. 2 | No. 3 | No. 4 | No. 5 | No. 6 |
|---|---|---|---|---|---|---|
| Class G Cement (wt. %) | 100.00 | 65.00 | 50.00 | 100.00 | 60.00 | 50.00 |
| Zeolite (wt. %) | 0 | 35.00 | 50.00 | 0 | 40.00 | 50.00 |
| CFR-3 (% bwob) | 0 | 0 | 1.00 | 0 | 0 | 0 |
| Water (% bwob) | 80.13 | 69.49 | 65.36 | 108.50 | 93.00 | 89.81 |
| Prehydrated Bentonite (% ww) | 2.00 | 0 | 0 | 3.00 | 0 | 0 |
| Density kg/m$^3$ (lb/gal) | 1620 (13.5) | 1620 (13.5) | 1620 (13.5) | 1500 (12.5) | 1500 (12.5) | 1500 (12.5) |

TABLE 11B

| | Rheology Results Dial Reading at 49° C. (120° F.) | | | | | | | | Time to 3.5 MPa | Compress. Strength Results Test Temp. at 66° C. (150° F.) | | Free Water at 49° C. | |
|---|---|---|---|---|---|---|---|---|---|---|---|---|---|
| Comp. No. | 600 RPM | 300 RPM | 200 RPM | 100 RPM | 60 RPM | 30 RPM | 6 RPM | 3 RPM | (500 psi) Hr:Min | MPa (psi) at 12 Hrs | MPa (psi) at 24 Hrs | (120° F.) (mL/250 mL) | Settling |
| 1 | 125 | 100 | 96 | 93 | 90 | 86 | 30 | 18 | 10:19 | 4.01 (581) | 5.74 (832) | 6 | None |
| 2 | 128 | 106 | 97 | 85 | 79 | 71 | 34 | 27 | 6:04 | 12.5 (1815) | 14.30 (2072) | 0 | None |
| 3 | 245 | 190 | 164 | 135 | 119 | 101 | 48 | 38 | 4:16 | 13.92 (2017) | 14.48 (2098) | 0 | None |
| 4 | 98 | 82 | 78 | 73 | 70 | 68 | 38 | 27 | >24 | 1.70 (246) | 2.70 (391) | 3 | None |
| 5 | 55 | 52 | 46 | 34 | 31 | 28 | 20 | 13 | 7:17 | 7.86 (1139) | 9.00 (1304) | 3 | None |
| 6 | 75 | 63 | 57 | 50 | 46 | 43 | 26 | 18 | 5:20 | 8.32 (1206) | 9.06 (1314) | 1 | None |

The data in Table 11B illustrates that lightweight cement compositions formed from cement mixes that comprised a base blend comprising zeolite (Nos. 2, 3, 5 and 6) possess properties comparable to lightweight cement compositions formed from conventional cement mixes (Nos. 1 and 4). In particular, cement composition Nos. 2, 3, 5 and 6 achieved greater compressive strengths than cement compositions Nos. 1 and 4, and in less time. For example, cement composition No. 4 only reached 2.7 MPa in 24 hours, while cement composition Nos. 2, 3, 5 and 6 achieved far greater compressive strengths in the same time period. In addition, in cement composition Nos. 2, 3, 5 and 6, the lack of settling indicates that there is no segregation of the lower density material, and the free water data indicates that the amount of supernatant water that separated from the composition after standing for the test period was less than 3.5 mL per 250 mL.

EXAMPLE 12

Tables 12A and 12B illustrate the effectiveness of microfine zeolites (zeolites with a mean particle size of about 3 to about 15 micrometers) for forming lightweight cement compositions having good compressive strength.

Seven cement compositions, each having the density as indicated in Table 12A were prepared according to API Specification RP 10B, 22$^{nd}$ Edition, 1997, of the American Petroleum Institute (the entire disclosure of which is hereby incorporated as if reproduced in its entirety).

Cement composition Nos. 1 and 2 were prepared from a cement mix comprising a base blend comprised of Class C cement and zeolite in the amounts (as weight percents) reported in Table 12A. The cement and zeolite were dry-mixed by hand in a glass jar, and then sodium sulfate and sodium carbonate were dry-mixed into the base blend as additives in the amounts as listed in Table 12A, where % bwob indicates a percentage by weight of the base blend. Clinoptilolite, which is commercially available from C2C Zeolite Corporation of Calgary, Canada, was used as the zeolite in the base blend of the cement mix for each of cement composition Nos. 1 and 2. The zeolite used to form the base blend of the cement mix for composition no. 1 had a particle size of about 13.12 micrometers, while the zeolite used to form the base blend of the cement mix for composition no. 2 had a particle size of about 182.86 micrometers.

Cement composition Nos. 3-7 were each formed from a cement mix comprising a base blend comprising 100 weight percent Class G cement. Zeolite in the amount listed in Table 12A was dry-mixed by hand in a glass jar with each cement mix as an additive, where "% bwob" indicates a percentage by weight of the base blend. Chabazite, which is commercially available from C2C Zeolite Corporation of Calgary, Canada, was used as the zeolite in the cement mixes for cement compositions nos. 3-7.

The cement mix for each of composition Nos. 1-7 comprised the base blend for each composition, plus the additives as listed in Table 12A. The cement compositions were prepared by addition of the cement mix over a 15 second period to a mixing fluid being held in a blender at 4000 RPM. When all of the cement mix was added to the mixing fluid, a cover was placed on the blender and mixing was continued at about 12,000 RPM for about 35 seconds. The temperature of each mix and mixing fluid was (24° C.) 75° F.

For cement composition nos. 1 and 2, the mixing fluid comprised water and a defoaming agent comprising polypropylene glycol, particulate hydrophobic silica and a liquid diluent, which is commercially available from Halliburton Energy Services, Duncan, Okla. under the tradename D-air 3000L. The water used to form cement composition nos. 1 and 2 is reported in Table 12A as a percent by weight of the base blend (% bwob) of each cement mix, and the amount of D-air 3000L is reported as L/sk (gal/sk), which indicates liters (or gallons) per sack of cement composition.

For cement composition nos. 3-7, the mixing fluid comprised water in the % bwob as listed in Table 12A.

TABLE 12A

| | No. 1 | No. 2 | No. 3 | No. 4 | No. 5 | No. 6 | No. 7 |
|---|---|---|---|---|---|---|---|
| Base Blend of Cement Mix | | | | | | | |
| Class C cement (wt. %) | 60.0 | 60.0 | 0 | 0 | 0 | 0 | 0 |
| Class G cement (wt. %) | 0 | 0 | 100 | 100 | 100 | 100 | 100 |
| Clinoptilolite | 40.0 | 40.0 | | | | | |

TABLE 12A-continued

|  | No. 1 | No. 2 | No. 3 | No. 4 | No. 5 | No. 6 | No. 7 |
|---|---|---|---|---|---|---|---|
| (Zeolite) (wt. %) | 13.12 μm particle size | 182.86 μm particle size | 0 | 0 | 0 | 0 | 0 |
| Cement Mix Additives |  |  |  |  |  |  |  |
| Chabazite (Zeolite) % bwob | 0 | 0 | 10 3.75 μm particle size | 10 5.17 μm particle size | 10 12.62 μm particle size | 10 126.30 μm particle size | 10 2675.0 μm particle size |
| Sodium sulfate % bwob | 6.9 | 6.9 | 0 | 0 | 0 | 0 | 0 |
| Sodium carbonate % bwob | 0.1 | 0.1 | 0 | 0 | 0 | 0 | 0 |
| Mixing Fluid |  |  |  |  |  |  |  |
| D-air 3000 L | 0.329 L/sk 0.037 gal/sk | 0.329 L/sk 0.037 gal/sk | 0 | 0 | 0 | 0 | 0 |
| Water % bwob | 134.99 | 134.99 | 113.02 | 113.02 | 113.02 | 113.02 | 113.02 |
| Properties |  |  |  |  |  |  |  |
| Density | 1400 kg/m³ (11.68 lb/gal) | 1400 kg/m³ (11.68 lb/gal) | 1500 kg/m³ (12.5 lb/gal) | 1500 kg/m³ (12.5 lb/gal) | 1500 kg/m³ (12.5 lb/gal) | 1500 kg/m³ (12.5 lb/gal) | 1500 kg/m³ (12.5 lb/gal) |
| Yield | 1.73 m³/t (2.61 ft³/sk) | 1.73 m³/t (2.61 ft³/sk) | 1.48 m³/t (2.24 ft³/sk) | 1.48 m³/t (2.24 ft³/sk) | 1.48 m³/t (2.24 ft³/sk) | 1.48 m³/t (2.24 ft³/sk) | 1.48 m³/t (2.24 ft³/sk) |

Compressive strength data for each cement composition and free fluid data of a suspension of the particular zeolite used in each cement composition tested are indicated in Table 12B. The compressive strength data was determined by Non-Destructive Sonic Testing as set forth in API Specification 10B 2$^{nd}$ Edition, 1997, of the American Petroleum Institute, the entire disclosure of which is hereby incorporated herein by reference. The free fluid data was gathered to show the effect of fineness of the zeolite on antisettling. A 48% suspension of the particular zeolite used for each of cement composition nos. 1-7 was prepared by mixing 288 g of the particular zeolite with 312 g of water in a blender at 2000 rpm for 1 minute. 250 mL of each zeolite suspension was poured into its own 250 ml graduated glass cylinder and then sealed with a plastic film wrap to prevent evaporation. A ninety-six hour test period was then initiated, during which the graduated cylinders were left standing. The free fluid that had gathered on top of each zeolite suspension inside the cylinder was measured. The percent of free fluid was calculated by multiplying the mL of free fluid gathered by 100, and then dividing the product by 250 mL. The amount of free fluid formed provides an indication of settling, where a zero percent value indicates no settling.

TABLE 12B

| Comp. No. | Comp. Test Temp. °C. (° F.) | Cement Strength Compressive Strength MPa (psi) | | | | Free fluid development (% of free fluid formed on an aqueous suspension of the particular zeolite used in each of Cement Comp. Nos. 1–7) | | | | | | | |
|---|---|---|---|---|---|---|---|---|---|---|---|---|
|  |  | 12 hr | 24 hr | 48 hr | 96 hr | 10 min | 30 min | 1 Hr | 2 Hr | 18 Hr | 24 Hr | 48 Hr | 96 Hr |
| 1 | 30 (86) | 1.52 (220) | 2.91 (422) | 4.69 (680) | — | 0 | 0 | 2 | 2 | 15 | 16 | 23 | 30 |
| 2 | 30 (86) | 1.36 (197) | 2.46 (357) | 3.17 (460) | — | 14 | 45 | 70 | 80 | 86 | 86 | 86 | 86 |
| 3 | 66 (150) | no data | no data | no data | no data | 0 | 0 | 0 | 0 | 0 | 0 | 0 | 0 |
| 4 | 66 (150) | 2.82 (409) | 4.24 (615) | 5.24 (760) | 5.52 (800) | 0.0 | 0.0 | 0.4 | 0.4 | 2.0 | 2.4 | 4.0 | 4.8 |
| 5 | 66 (150) | 3.17 (460) | 4.62 (669) | 6.00 (870) | 6.90 (1000) | 0.0 | 0.0 | 0.4 | 0.4 | 2.4 | 3.2 | 4.8 | 5.6 |
| 6 | 66 (150) | 2.37 (344) | 3.71 (538) | 4.83 (700) | 5.52 (800) | 0.8 | 14.4 | 17.6 | 18.4 | 18.4 | 18.4 | 18.4 | 19.2 |
| 7 | 66 (150) | 0 (0) | 0 (0) | 0 (0) | not set | 11.1 | 11.1 | 11.1 | 11.1 | 12.2 | 18.8 | 18.8 | 20.0 |

The data in Table 12B illustrates that cement compositions comprising zeolites having a mean particle size of equal to or less than about 15 micrometers show an improved rate of early compressive strength development over cement compositions comprising zeolites having a mean particle size of equal to or greater than about 100 micrometers. In addition, Table 12B illustrates that the improved rate of early compressive strength exhibited by the cement compositions with the finer particle size zeolite is achievable at a broad range of temperatures. The free fluid data illustrates that zeolite suspensions comprising zeolites having a mean particle size of equal to or less than about 15 micrometers show less free fluid development over time than zeolite suspensions comprising zeolites having a mean particle size of equal to or greater than about 100 micrometers. Zeolite suspensions comprising zeolites having a mean particle size less than about 5 micrometers have no free fluid development, indicating excellent antisettling properties.

EXAMPLE 13

Example 13 illustrates that zeolites can be used as dispersants to reduce the apparent viscosity of cement compositions.

Twelve cement compositions were prepared according to API Specification RP 10B, 22$^{nd}$ Edition, 1997, of the American Petroleum Institute (the entire disclosure of which is hereby incorporated as if reproduced in its entirety).

Composition Nos. 1-9 were each formed from a cement mix comprising a base blend comprised of the components in the amounts (as weight percents) listed in Table 13A. Each base blend was prepared by dry-mixing by hand in a glass jar the amounts of the components as listed in Table 13A. As shown in Table 13A, the components selected for each base blend varied, (e.g., cements of Classes A, C, H, and G, fly ashes of Class F and G, silicalite, hydrated lime, and zeolite), and the amount of each components' contribution to the 100 weight percent of the base blend also varied.

Additives of the types and amounts (reported as a percentage by weight of the base blend (% bwob)) as listed in Table 13A were also dry-mixed in the glass jar with the base blend. The first exception to the foregoing is the NaCl, which although dry-mixed with the base blend, is reported as percentage by weight of water because it is known to affect density calculations of the cement composition when it is dissolved in water. The second exception to the foregoing is the prehydrated bentonite, which is reported as a percentage by weight of water because it was added to the mixing fluid for the particular base blend.

The base blend and the additives comprised the cement mix from which a cement composition was prepared. The cement composition was prepared by adding the cement mix to mixing fluid being maintained in a blender at 4000 RPM. All of the cement mix was added to the mixing fluid over a 15 second period. A cover was then placed on the blender and mixing was continued at about 12,000 RPM for about 35 seconds. The mixing fluid comprised water in the amount as listed in Table 13A, where % bwob indicates a percent by weight of the base blend comprising the cement mix.

Composition Nos. 10-12 were formed from a cement mix comprising a base blend comprising 100 weight percent of the cementitious material listed in Table 13A. Additives in the amounts listed in Table 13A, which are reported as a percentage by weight of the base blend, were dry-mixed by hand in the glass jar with the base blend. The exception to the foregoing was the prehydrated bentonite, which is reported as a percentage by weight of water because it was added to the mixing fluid for the particular cement mix.

The base blend and the additives comprised the cement mix from which a cement composition was prepared. The cement composition was prepared by adding the cement mix to mixing fluid in the manner described above with respect to cement composition Nos. 1-9. The cement mix for each of cement composition Nos. 10 and 11 was mixed with a mixing fluid comprising water in the amounts reported in Table 13A, which are reported as a percentage by weight of the base blend of the cement mix. The cement mix for cement composition No. 12 was mixed with a mixing fluid comprising water and prehydrated bentonite in the amounts reported in Table 13A, where the water amount is reported as a percentage by weight of the base blend, and the prehydrated bentonite is reported as a percentage by weight of the amount of water. Prehydrated bentonite is bentonite that is mixed in water and added to the mixing fluid as a liquid, where 1% of prehydrated bentonite is equivalent to 4-5% dry blended bentonite. Bentonite is a montmorillonite clay commercially available from Halliburton Energy Services, Duncan, Okla.

The temperatures of the cement mix and the mixing fluid for all of the compositions listed in Table 13A were 24° C. (75° F.).

TABLE 13A

|  | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|
| Base Blend | | | | | | | | | | | | |
| Class A Cement (wt. %) | 56 | 56 | 0 | 0 | 0 | 0 | 0 | 0 | 0 | 0 | 0 | 0 |
| Class C cement (wt. %) | 0 | 0 | 0 | 0 | 0 | 0 | 0 | 0 | 0 | 100 | 100 | 0 |
| Class H cement (wt. %) | 0 | 0 | 70 | 70 | 0 | 0 | 0 | 0 | 0 | 0 | 0 | 0 |
| Class G cement (wt. %) | 0 | 0 | 0 | 0 | 67 | 56 | 70 | 26 | 88 | 0 | 0 | 100 |
| Class F Fly Ash (wt. %) | 22 | 22 | 12.7 | 12.7 | 0 | 22 | 30 | 61 | 12 | 0 | 0 | 0 |
| Class C Fly Ash (wt. %) | 0 | 0 | 4.6 | 4.6 | 0 | 0 | 0 | 0 | 0 | 0 | 0 | 0 |
| Silicalite (wt. %) | 22 | 0 | 12.7 | 0 | 0 | 22 | 0 | 0 | 0 | 0 | 0 | 0 |
| Zeolite (wt. %) | 0 | 22 | 0 | 12.7 | 33 | 0 | 0 | 0 | 0 | 0 | 0 | 0 |
| Hydrated Lime (wt. %) | 0 | 0 | 0 | 0 | 0 | 0 | 0 | 13 | 0 | 0 | 0 | 0 |
|  | 100 | 100 | 100 | 100 | 100 | 100 | 100 | 100 | 100 | 100 | 100 | 100 |
| Additives | | | | | | | | | | | | |
| Silicalite % bwob | 0 | 0 | 0 | 0 | 0 | 0 | 0 | 0 | 0 | 6 | 0 | 0 |
| Zeolite % bwob | 0 | 0 | 0 | 0 | 0 | 0 | 0 | 0 | 0 | 0 | 6 | 0 |
| Microsand % bwob | 18 | 18 | 0 | 0 | 0 | 0 | 0 | 0 | 0 | 0 | 0 | 0 |
| HR-12% bwob | 0.9 | 0.9 | 0 | 0 | 0 | 0 | 0 | 0 | 0 | 0 | 0 | 0 |
| Bentonite % bwob | 10 | 10 | 0 | 0 | 0 | 0 | 6 | 4 | 8 | 6 | 6 | 0 |
| Halad-344% bwob | 0 | 0 | 0 | 0 | 0 | 0 | 0 | 0 | 0 | 0.3 | 0.3 | 0 |
| FWCA % bwob | 0 | 0 | 0 | 0 | 0 | 0 | 0 | 0 | 0 | 0.4 | 0.4 | 0 |
| LAP-1% bwob | 0 | 0 | 0.5 | 0.5 | 0 | 0 | 0 | 0 | 0 | 0 | 0 | 0 |
| HR-7% bwob | 0 | 0 | 0.3 | 0.3 | 0 | 0 | 0 | 0 | 0 | 0 | 0 | 0 |
| NaCl (% ww) | 0 | 0 | 3.67 | 3.67 | 0 | 0 | 0 | 0 | 0 | 0 | 0 | 0 |
| Gilsonite % bwob | 0 | 0 | 5.75 | 5.75 | 0 | 0 | 0 | 0 | 0 | 0 | 0 | 0 |
| Flocele % bwob | 0 | 0 | 0.29 | 0.29 | 0 | 0 | 0 | 0 | 0 | 0 | 0 | 0 |

TABLE 13A-continued

|  | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|
| CFR-3% bwob | 0 | 0 | 0.3 | 0 | 0 | 0 | 0 | 0 | 0 | 0 | 0 | 0 |
| Prehydrated Bentonite (% ww) | 0 | 0 | 0 | 0 | 0 | 0 | 0 | 0 | 0 | 0 | 0 | 3 |
| Water (% bwob) | 139.7 | 138.1 | 75.1 | 75.1 | 95.2 | 94.1 | 102.6 | 87.9 | 109.2 | 115.4 | 175.1 | 108.5 |

The zeolite used as either a component of the base blend of a cement mix, or as an additive to a cement mix was chabazite, which is commercially available from C2C Zeolite Corporation of Calgary, Canada.

Class F fly ash is a lightweight additive that is commercially available from Halliburton Energy Services as Pozmix A. Silicalite is a lightweight additive comprising fumed silica, and is commercially available from Halliburton Energy Services. Microsand is the brand name for a fine particle size high-purity crystalline silica commercially available from Halliburton Energy Services. HR-12 is a retarder comprising a lignosulfonate/organic acid blend, and is commercially available from Halliburton Energy Services. FWCA is a free water control additive comprising cellulose, and is commercially available from Halliburton Energy Services. HR-7 is a retarder comprising a lignosulfonate, and is commercially available from Halliburton Energy Services. Gilsonite is a loss circulation agent comprising a naturally occurring bitumen and is commercially available from Halliburton Energy Services. Flocele is a loss circulation agent comprising cellophane, and is commercially available from Halliburton Energy Services. CFR-3 is the tradename for a condensation product of formaldehyde, acetone and a sulfite, which is commercially available as a dispersant from Halliburton Energy Services.

Compressive strength and rheology data were determined for each composition. Compressive strength was tested according to Non-Destructive Sonic Testing as set forth in API Specification 10B $22^{nd}$ Edition, 1997, of the American Petroleum Institute, the entire disclosure of which is incorporated herein by reference.

The viscosity (dial reading) of the cement compositions was measured using a Fann Model 35 viscometer, and reported in the Rheology Results in Table 13B. The viscosity was taken as the measurement of the dial reading on the Fann Model 35 at the different rotational speeds as indicated in 600 to 3 RPM, and at the temperature as indicated in Table 13B. For example, the Fann Viscometer is rotated at 300 RPM (revolutions per minute) for 60 seconds and a value on the dial is read, the speed is then changed to 200 RPM and the new value on the dial reading taken. There are a number of theoretical models known to those of ordinary skill in the art that can be used to convert the values from the dial readings at the different RPM's into viscosity (centipoises). In addition, different viscometer models use different RPM values, thus, in some instances, a measurement is not available at a particular RPM value.

The rheology data was obtained generally according to the procedures set forth in Section 12 of the API Specification RP 10B, $22^{nd}$ Edition, 1997, of the American Petroleum Institute (the entire disclosure of which is hereby incorporated as if reproduced in its entirety). The aforementioned API procedures were modified in that the initial reading at 300 RPM was taken after 60 seconds of continuous rotation at that speed. Dial readings at 200, 100, 60, 30, 6 and 3 were then recorded in descending order at 20-second intervals. The final reading at 600 RPM was taken after 60 seconds of continuous rotation at that speed.

The results of the compressive strength (Compress. Strength) and rheology testing are reported below in Table 13B.

TABLE 13B

| No. | Density kg/m³ (lb/gal) | Dial readings Test Temp °C. (°F.) | Dial Readings | | | | | | | | Compress. Strength Test Temp °C. (°F.) | Compress. Strength Measurement MPa (psi) | |
|---|---|---|---|---|---|---|---|---|---|---|---|---|---|
| | | | 600 RPM | 300 RPM | 200 RPM | 100 RPM | 60 RPM | 30 RPM | 6 RPM | 3 RPM | | 12 Hr | 24 Hr |
| 1 | 1440 (12.0) | 82 (180) | — | 30 | 26 | 22 | 21 | 20 | 19 | 18 | 121 (250) | 3.08 (446) | 3.30 (479) |
| 2 | 1440 (12.0) | 82 (180) | 20 | 15 | 14 | 12 | 11 | 10 | 9 | 9 | 121 (250) | 2.82 (408) | 2.98 (432) |
| 3 | 1584 (13.2) | 60 (140) | — | 39 | 33 | 27 | 24 | 21 | 19 | 18 | 82 (180) | 0.08 (12) | 0.11 (17) |
| 4 | 1584 (13.2) | 60 (140) | — | 36 | 30 | 26 | 23 | 20 | 16 | 15 | 82 (180) | 0.15 (21) | 0.19 (27) |
| 5 | 1500 (12.5) | 49 (120) | 40 | 30 | 27 | 25 | 23 | 20 | 19 | 18 | 66 (150) | 7.16 (1037) | 9.11 (1320) |
| 6 | 1500 (12.5) | 49 (120) | 60 | 50 | 44 | 40 | 37 | 33 | 29 | 22 | 66 (150) | 9.27 (1344) | 10.76 (1559) |
| 7 | 1500 (12.5) | 49 (120) | 59 | 50 | 48 | 47 | 46 | 45 | 35 | 22 | 66 (150) | 1.725 (250) | 4.42 (640) |
| 8 | 1500 (12.5) | 49 (120) | 102 | 94 | 90 | 84 | 80 | 70 | 33 | 23 | 66 (150) | 1.27 (184) | 4.80 (695) |
| 9 | 1500 (12.5) | 49 (120) | 89 | 77 | 75 | 71 | 70 | 69 | 34 | 26 | 66 (150) | 2.17 (315) | 3.14 (455) |

TABLE 13B-continued

| No. | Density kg/m³ (lb/gal) | Dial readings Test Temp °C. (°F.) | Dial Readings | | | | | | | | Compress. Strength Test Temp °C. (°F.) | Compress. Strength MPa (psi) | |
|---|---|---|---|---|---|---|---|---|---|---|---|---|---|
| | | | 600 RPM | 300 RPM | 200 RPM | 100 RPM | 60 RPM | 30 RPM | 6 RPM | 3 RPM | | 12 Hr | 24 Hr |
| 10 | 1500 (12.5) | 88 (190) | — | 50 | 34 | 20 | 15 | 11 | 8 | 6 | 77 (170) | 0.97 (140) | 1.35 (195) |
| 11 | 1500 (12.5) | 88 (190) | — | 42 | 28 | 18 | 13 | 9 | 6 | 5 | 77 (170) | 0.72 (105) | 1.15 (167) |
| 12 | 1500 (12.5) | 49 (120) | 98 | 82 | 78 | 73 | 70 | 68 | 38 | 27 | 66 (150) | 1.70 (246) | 2.70 (391) |

The rheology data in Table 13B illustrates that zeolites can be used as dispersants to reduce the apparent viscosity of cement compositions. Those compositions comprising zeolite have lower apparent viscosity values and retain good compressive strength.

EXAMPLE 14

Table 14 illustrates another embodiment for the use of zeolite to prepare cement compositions. According to this embodiment, zeolite in an aqueous form is used to make cement compositions, where the aqueous zeolite imparts benefits to the cement compositions similar to those imparted by dry-mixed zeolites.

First, a base aqueous zeolite suspension comprising 48 weight percent zeolite was prepared by adding 7.2 kg of zeolite to 7.8 kg of water in a 5 gallon bucket, and stirring with a variable speed Premier Mill Corp. laboratory dispersator mixer at low speed until a homogenous suspension was obtained. This homogenous suspension served as a bulk sample, and was subsequently used to prepare the cement compositions listed in Tables 14A and 14D. To preserve the bulk sample, the bucket was sealed and then prior to use, was hand shaken to make sure the suspension was homogenous. The zeolite used to form the bulk sample was BZM ZeoFume, which is a micronized natural zeolite mineral comprised primarily of chabazite, is mined at the Bowie deposit in Arizona, and is commercially available from C2C Corporation.

Each cement composition was prepared according to the procedures set forth in API Specification RP10B, 22nd edition, 1997, of the American Petroleum Institute, the entire disclosure of which is incorporated herein by reference. Generally however, each cement composition was formed from a cement mix comprising a base blend comprising 100 weight percent Class G cement. The cement mixes for compositions 3, 5 and 7 further comprised zeolite as an additive, which was dry-mixed by hand with the Class G cement in the amount reported in Table 14A. The amount of zeolite as an additive is reported in % bwob, which indicates a percentage by weight of the base blend, namely the 100% of Class G cement. The zeolite dry-mixed into the cement mixes for compositions 3, 5 and 7 was the BZM ZeoFume described above.

The cement mixes for each of composition nos. 10 and 11 further comprised hydrated lime, which was dry-mixed with the base blend in an amount of 5% by weight of the base blend. The Class G cement, and the zeolite or hydrated lime comprised the cement mix from which each cement composition was prepared. The cement compositions were prepared by mixing each cement mix with a mixing fluid comprising water in the amount listed in Table 14A, which is reported as a percentage by weight of the base blend (% bwob) of each cement mix. For composition no. 8, the mixing fluid further comprised HR-6L in an amount of 0.07 gal/sk. HR-6L is an aqueous solution of lignosulfonate, which is commercially available as a retarder from Halliburton Energy Services.

Prior to mixing of the cement mix with the mixing fluid, the mixing fluid was held in a blender set to operate at 4000 RPM, and the amount of the 48% aqueous zeolite suspension as reported in Table 14A was added over a period of 5 seconds. The amount of the 48% aqueous zeolite suspension is reported in cubic meters per ton (m³/t) and the equivalent gallon per sack (gal/sk) value. After addition of the aqueous zeolite suspension to the mixing fluid, the blender speed was maintained at 4000 RPM for a further 5 seconds before the cement mix was added. The blender speed was maintained at 4000 RPM until all of the cement mix was added to the blender, which was over about a 15 second period. The blender was then covered, and the blender speed was increased to 12,000 RPM for about 35 seconds.

Alternatively, the mixing fluid is maintained alone in the Waring blender prior to addition of the cement mix. According to this alternative, all of the cement mix is added to the mixing fluid in the Waring blender over a 15 second period, at 4000 RPM of the blender. The blender is then covered, and the blender speed increased to 12,000 RPM for about 35 seconds. The blender is then slowed to about 4000 RPM, and the amount of the 48% aqueous zeolite suspension is added. The blender speed is maintained at about 4000 RPM until a homogenous mix is achieved.

The column labeled "Zeolite Equivalent % dry basis" illustrates the amount of dry zeolite that is equivalent to the amount of zeolite in the composition, added as an aqueous zeolite suspension.

TABLE 14A

| No. | Density kg/m (lb/gal) | Dry Zeolite % bwob | 48% Aq. Zeolite m³/t (gal/sk) | Zeolite Equivalent % dry basis | Water % bwob |
|---|---|---|---|---|---|
| 1 | 1620 (13.5) | 0 | 0.494 (5.55) | 32 | 59.5 |
| 2 | 1620 (13.5) | 0 | 0.762 (8.56) | 50 | 48.8 |
| 3 | 1620 (13.5) | 50 | 0 | 50 | 101.3 |
| 4 | 1620 (13.5) | 0 | 1.016 (11.42) | 67 | 38.7 |
| 5 | 1620 (13.5) | 67 | 0 | 67 | 113.7 |
| 6 | 1440 (12.0) | 0 | 0.762 (8.56) | 50 | 112.6 |
| 7 | 1440 (12.0) | 50 | 0 | 50 | 166.7 |
| 8 | 1620 (13.5) | 0 | 0.762 (8.56) | 50 | 48.4** |
| 9 | 1620 (13.5) | 0 | 0.762 (8.56) | 50 | 52.4* |
| 10 | 1440 (12.0) | 0 | 0.762 (8.56) | 50 | 112.6 |
| 11 | 1440 (12.0) | 0 | 1.016 (11.42) | 67 | 113.0 |

*seawater
**With 0.07 gal/sk HR-6L brand commercial retarder as discussed above.

The viscosity (dial reading) of the cement compositions was measured using a Fann Model 35 viscometer, and reported in the Rheology Results in Table 14B. The viscosity was taken as the measurement of the dial reading on the Fann Model 35 at the different rotational speeds as indicated in 600 to 3 RPM, and at the temperature as indicated in Table 14B. For example, the Fann Viscometer is rotated at 300 RPM (revolutions per minute) for 60 seconds and a value on the dial is read, the speed is then changed to 200 RPM and the new value on the dial reading taken. There are a number of theoretical models known to those of ordinary skill in the art that can be used to convert the values from the dial readings at the different RPM's into viscosity (centipoises). In addition, different viscometer models use different RPM values, thus, in some instances, a measurement is not available at a particular RPM value.

The rheology data was obtained generally according to the procedures set forth in Section 12 of the API Specification RP 10B, 22$^{nd}$ Edition, 1997, of the American Petroleum Institute (the entire disclosure of which is hereby incorporated as if reproduced in its entirety). The aforementioned API procedures were modified in that the initial reading at 300 RPM was taken after 60 seconds of continuous rotation at that speed. Dial readings at 200, 100, 60, 30, 6 and 3 were then recorded in descending order at 20-second intervals. The final reading at 600 RPM was taken after 60 seconds of continuous rotation at that speed. The results of the rheology testing are reported below in Table 14B. The rheology results indicate that cement compositions prepared from cement mixes comprising an aqueous zeolite suspension have favorable mixability and thixotropic characteristics.

Compressive strength and thickening time for those compositions comprising aqueous zeolite (nos. 1, 2, 4, 6 and 8-11) were tested. The temperature at which the compressive strength data was gathered was an arbitrarily chosen value based on typical values for bottom hole static temperature (BHST) of a well. Thickening time was tested by a Well Simulation Thickening Time test as set forth in API Specification 10B 22$^{nd}$ Edition, 1997, of the American Petroleum Institute, the entire disclosure of which is incorporated herein by reference. Compressive strength was tested by Non-Destructive Sonic Testing as set forth in API Specification 10B 22$^{nd}$ Edition, 1997, of the American Petroleum Institute, the entire disclosure of which is incorporated herein by reference. The test results are indicated in Table 14C, and illustrate the utility of using aqueous zeolite in cement compositions to achieve good compressive strengths and thickening times.

TABLE 14C

| No. | Density kg/m³ (lb/gal) | Zeolite m³/t (gal/sk) | Thickening time (Hr:min) 49° C. (120° F.) | Compressive strength MPa (psi) 66° C. (150° F.) | | | |
|---|---|---|---|---|---|---|---|
| | | | | 4 Hr | 8 Hr | 12 Hr | 24 Hr |
| 1 | 1620 (13.5) | 0.494 (5.55) | 3:40 | 1.45 (210) | 4.42 (640) | 10.45 (1515) | 13.80 (2000) |
| 2 | 1620 (13.5) | 0.762 (8.56) | 1:16 | 2.07 (300) | 10.35 (1500) | 14.95 (2166) | 15.25 (2210) |
| 4 | 1620 (13.5) | 1.016 (11.42) | 2:20 | 2.07 (300) | 10.35 (1500) | 15.11 (2190) | 15.12 (2192) |
| 6 | 1440 (12.0) | 0.762 (8.56) | >15 | 0.41 (60) | 2.07 (300) | 4.18 (606) | 5.80 (840) |
| 8 | 1620 (13.5) | 0.762 (8.56) | 3:45 | 1.72 (250) | 4.48 (650) | 11.92 (1728) | 14.88 (2157) |
| 9 | 1620 (13.5)* | 0.762 (8.56) | 2:25 | 1.21 (175) | 8.28 (1200) | 12.41 (1798) | 15.20 (2203) |
| 10 | 1440 (12.0) | 0.762 (8.56) | 11:25 | 0.41 (60) | 2.21 (320) | 4.35 (631) | 6.13 (888) |
| 11 | 1440 (12.0) | 1.016 (11.42) | >24 | 0.62 (90) | 2.90 (420) | 5.38 (779) | 6.60 (956) |

The temperature at which the compressive strength data was gathered and reported in Table 14C was 150° F. BHST. Table 14D reports compressive strength and thickening time data gathered at 180° F. BHST for compositions formed from components as listed in Table 14D. The compositions listed in Table 14D were prepared according to the procedures set forth in API Specification RP10B, 22nd edition, 1997, of the American Petroleum Institute, the entire disclosure of which is incorporated herein by reference. Generally, the API procedure used is as described above with respect to the compositions listed in Table 14A. Each cement composition was formed from a cement mix comprising a base blend comprising 100 weight percent Class G cement. The cement compositions were prepared by mixing each cement mix with a mixing fluid comprising water in the amount listed in Table 14D, which is reported as a percentage by weight of the base blend (% bwob) of each cement mix. For composition nos. 1-3, mixing fluid further comprised HR-6L in the amount reported in Table 14D. HR-6L is the tradename for an aqueous solution of lignosulfonate, which is commercially available as a retarder from Halliburton Energy Services. An amount of the 48% aqueous zeolite suspension as reported in Table 14D was added to the mixing fluid over a period of 5 seconds, in the manner as described above with respect to Table 14A. The amount of

TABLE 14B

| | | Rheology @ 49° C. (120° F.) (Fann 35 dial readings) | | | | | | | |
|---|---|---|---|---|---|---|---|---|---|
| No. | Mixability | 600 RPM | 300 RPM | 200 RPM | 100 RPM | 60 RPM | 30 RPM | 6 RPM | 3 RPM |
| 1 | Good | 65 | 51 | 44 | 37 | 34 | 30 | 21 | 14 |
| 2 | Good | 126 | 101 | 95 | 85 | 79 | 70 | 23 | 16 |
| 3 | Good | 150 | 132 | 116 | 105 | 97 | 87 | 31 | 22 |
| 4 | Reasonable | 210 | 169 | 152 | 121 | 90 | 78 | 35 | 24 |
| 5 | Reasonable | 225 | 205 | 187 | 164 | 146 | 120 | 44 | 34 |
| 6 | Excellent | 22 | 16 | 15 | 12 | 11 | 8 | 7 | 6 |
| 7 | Excellent | 33 | 24 | 20 | 16 | 14 | 12 | 8 | 5 |
| 8 | Good | 93 | 77 | 71 | 62 | 59 | 57 | 27 | 23 |
| 9 | Good | 67 | 53 | 46 | 37 | 32 | 27 | 11 | 7 |
| 10 | Excellent | 35 | 30 | 28 | 25 | 24 | 23 | 14 | 12 |
| 11 | Excellent | 49 | 38 | 35 | 30 | 27 | 25 | 12 | 10 | the 48% aqueous zeolite suspension is reported in cubic meters per ton (m³/t) and the equivalent gallon per sack (gausk) value.

As was the case with respect to the results reported in Table 14C, the compressive strength test temperature was an arbitrarily chosen value based on typical BHST values for a well. Thickening time was tested by the Well Simulation Thickening Time test as set forth in API Specification 10B 22$^{nd}$ Edition, 1997, and incorporated above. Compressive strength was tested by Non-Destructive Sonic Testing as set forth in API Specification 10B 22$^{nd}$ Edition, 1997, of the American Petroleum Institute, and incorporated above.

percent zeolite of the aqueous zeolite suspension. Thus, Suspension No. 1, which was a 40% active zeolite suspension, was prepared by mixing 160 grams of the zeolite in 240 grams of water in a Waring blender at 4000 RPM for about 1 minute. Suspension No. 2 was a 45% active zeolite suspension that was prepared by mixing 180 grams of the zeolite in 220 grams of water in a Waring blender at 4000 RPM for about 1 minute. Suspension No. 3 was a 47.5% active zeolite suspension that was prepared by mixing 190 grams of the zeolite in 210 grams of water in a Waring blender at 4000 RPM for about 1 minute. Suspension No. 4 was a 48% active zeolite suspension that was prepared by

TABLE 14D

| No | Density kg/m³ (lb/gal) | Aq. Zeolite m³/t (gal/sk) | Zeolite Equiv. % dry basis | HR-6L m³/t (gal/sk) | Water % bwob | Thick. time Hr:min at 66 C. (150° F.) | Compress. Strength at 82 C. (180° F.) MPa (psi) | | | |
|---|---|---|---|---|---|---|---|---|---|---|
| | | | | | | | 4 Hr | 8 Hr | 12 Hr | 24 Hr |
| 1 | 1620 (13.5) | 0.762 (8.56) | 50 | 0.018 (0.20) | 47.6 | 2:15 | 0.69 (100) | 10.4 (1500) | 13.0 (1879) | 14.3 (2076) |
| 2 | 1620 (13.5) | 0.762 (8.56) | 50 | 0.027 (0.30) | 47.1 | 2:57 | 0.69 (100) | 7.59 (1100) | 12.6 (1822) | 14.5 (2095) |
| 3 | 1620 (13.5) | 0.762 (8.56) | 50 | 0.031 (0.35) | 46.8 | 3:25 | 0.69 (100) | 11.7 (1700) | 13.2 (1910) | 15.2 (2202) |
| 4 | 1620 (13.5) | 0.762 (8.56) | 50 | 0.00 (0.00) | 48.8 | 1:16 | 2.41 (350) | 10.4 (1500) | 15.2 (2200) | 15.2 (2200) |

The compressive strength and thickening time results illustrate that cement compositions comprising aqueous zeolite are acceptable for oil well cementing practices.

One advantage of an embodiment using an aqueous zeolite suspension is that pumpable slurries are attainable with aqueous zeolite at high concentrations. Moreover, retardants (e.g., HR-6L) used with conventional compositions can be used with aqueous zeolite embodiments. In addition, seawater can be used as the mixing fluid, which makes this embodiment useful in conducting offshore operations. Aqueous zeolite suspensions further provide for large quantities of zeolite to be incorporated into a cement composition, for example, up to 11.42 gal/sk (equivalent to 67% solid zeolite added to a dry blend).

Still another advantage of an embodiment comprising an aqueous zeolite suspension is that the zeolite remains suspended in water over time and does not settle out, thus a stock solution can be kept for long periods of time. Tables 14E-14G illustrate the stability of various embodiments of aqueous zeolite suspensions.

First, five aqueous zeolite suspensions, each having a different zeolite activity percent, were prepared by adding BZM ZeoFume to water. "Active" refers to the weight mixing 192 grams of the zeolite in 208 grams of water in a Waring blender at 4000 RPM for about 1 minute. Suspension No. 5 was a 50% active zeolite suspension that was prepared by mixing 200 grams of the zeolite in 200 grams of water in a Waring blender at 4000 RPM for about 1 minute.

The stability of each of the five suspensions was then determined by sealing each suspension in a 100 mL measuring cylinder, and measuring the amount of free water that collected over time. The free water data is indicated in Table 14E.

TABLE 14E

| Susp. No. | Free Water (mL/100 mL) at Time in Days | | | | | | | | | |
|---|---|---|---|---|---|---|---|---|---|---|
| | 0 Days | 0.17 Days | 0.25 Days | 0.75 Days | 1.0 Days | 2.25 Days | 3.25 Days | 4.0 Days | 5.0 Days | 7.25 Days |
| 1 (40%) | 0 | 8 | 11 | 16 | 20 | 20 | 20 | 20 | 20 | 20 |
| 2 (45%) | 0 | 2 | 3 | 5 | 7 | 8 | 8.5 | 8.5 | 8.5 | 8.5 |
| 3 (47.5%) | 0 | 1 | 2 | 3 | 4.5 | 4.5 | 4.5 | 4.5 | 4.5 | 4.5 |
| 4 (48%) | 0 | 1 | 2 | 2 | 3 | 3.5 | 3.5 | 3.5 | 3.5 | 3.5 |
| 5 (50%) | 0 | 1 | 1.0 | 1.0 | 1.5 | 1.5 | 1.5 | 1.5 | 1.5 | 1.5 |

The viscosity (dial reading) of Suspension No. 4 (the 48% active zeolite suspension) was measured using a Fann Model 35 viscometer, and reported in the rheology data in Tables 14F and 14G. The viscosity was taken as the measurement of the dial reading on the Fann Model 35 at the different rotational speeds as indicated in 600 to 3 RPM, and at the temperature as indicated in the tables. For example, the Fann Viscometer is rotated at 300 RPM (revolutions per minute) for 60 seconds and a value on the dial is read, the speed is then changed to 200 RPM and the new value on the dial reading taken. There are a number of theoretical models known to those of ordinary skill in the art that can be used to convert the values from the dial readings at the different RPM's into viscosity (centipoises). In addition, different viscometer models use different RPM values, thus, in some instances, a measurement is not available at a particular RPM value.

The rheology data was obtained generally according to the procedures set forth in Section 12 of the API Specification RP 10B, 22$^{nd}$ Edition, 1997, of the American Petroleum Institute (the entire disclosure of which is hereby incorporated as if reproduced in its entirety). The foregoing API procedure was modified in that the initial reading at 300 RPM was taken after 60 seconds continuous rotation at that speed. Dial readings at 200, 100, 60, 30, 6 and 3 were then recorded in descending order at 20-second intervals. The final reading at 600 RPM was taken after 60 seconds continuous rotation at that speed.

TABLE 14F

Suspension No. 4
Rheology @ 27° C. (80° F.) (Fann 35 dial readings)

| Time | 600 RPM | 300 RPM | 200 RPM | 100 RPM | 60 RPM | 30 RPM | 6 RPM | 3 RPM |
|---|---|---|---|---|---|---|---|---|
| 0 min | 131 | 84 | 67 | 50 | 43 | 39 | 35 | 29 |
| 30 min | 115 | 76 | 60 | 42 | 35 | 31 | 28 | 24 |
| 1.0 Hr | 132 | 80 | 63 | 45 | 37 | 31 | 27 | 23 |
| 2.0 Hr | 129 | 78 | 61 | 44 | 36 | 30 | 28 | 24 |
| 3.0 Hr | 131 | 80 | 62 | 43 | 35 | 30 | 28 | 25 |
| 24.0 Hr | 154 | 92 | 71 | 50 | 41 | 35 | 20 | 28 |
| 5 Days | 169 | 100 | 81 | 59 | 49 | 42 | 37 | 31 |

TABLE 14G

Suspension No. 4 in Sealed Container
Rheology @ 27° C. (80° F.) (Fann 35 dial readings)

| Time | 600 RPM | 300 RPM | 200 RPM | 100 RPM | 60 RPM | 30 RPM | 6 RPM | 3 RPM |
|---|---|---|---|---|---|---|---|---|
| 0 min | 118 | 81 | 66 | 50 | 45 | 42 | 34 | 28 |
| 2 weeks | 118 | 77 | 65 | 51 | 46 | 44 | 42 | 41 |

The rheology results reported in Table 14F indicate that the aqueous zeolite suspension remained stable over time, as there is no significant difference in rheology from initial mixing for up to three hours. When stored in a sealed container, the suspension remains stable for at least 2 weeks, as indicated by the stable rheology readings reported in Table 14G.

EXAMPLE 15

Tables 15A and 15B illustrate the effectiveness of aqueous zeolite suspensions as a carrier for lightweight materials. The aqueous zeolite suspensions carrying lightweight materials are used to prepare lightweight cement compositions of desired densities.

In Example 15, the cement compositions were to be prepared from a cement mix comprising a base blend comprising 100 weight percent of a cementitious material as indicated in Table 15A. Knowing that the base blend for each composition would comprise 100 weight percent of the indicated cementitious material, and knowing the desired density for the final cement composition, the aqueous zeolite suspensions were prepared first. It is understood, however, that the aqueous zeolite suspensions can be prepared last. The amounts of water, zeolite, and lightweight materials used to form the aqueous zeolite were determined based on the desired density of the final cement composition, and the fact that the base blend of each cement composition comprised 100% cement. Thus, the amount of aqueous zeolite suspension used to form each cement composition can be expressed relative to the weight of the base blend, i.e., the 100 weight percent cement. For example, for Sample No. 1, the total weight percent of the components of the aqueous zeolite suspension amounts to 206 weight percent of the base blend. For Sample Nos. 2 and 3, the total weight percent of the components of the aqueous zeolite suspension amounts to 130 weight percent of the base blend.

Accordingly, three aqueous zeolite suspensions were prepared by mixing zeolite into water held in a Waring blender in the amounts as listed in Table 15A, where % bwob indicates a percentage of the weight of the base blend of each cement mix. The zeolite was mixed into the water at about 2000-4000 RPM, at a rate to produce a homogenized mix. The zeolite used was chabazite, which is commercially available from C2C Zeolite Corporation of Calgary, Canada.

The lightweight materials, which are Spherelite and S-38 3M Scotchlite beads for Sample No. 1, and Spherelite for Samples 2 and 3, were slowly added into the blender with the zeolite and the water in the amounts as listed in Table 15A, which is also reported as a percentage of the weight of the base blend (% bwob) of each cement mix. The lightweight materials were added to each blender at a variable rate between about 2000 RPM and about 4000 RPM until all of the lightweight materials had been added. When addition of the lightweight materials was complete, each of the aqueous zeolite suspensions was set aside for the preparation of the cement mixes.

Three cement mixes were prepared according to API Specification RP10B, 22$^{nd}$ edition, 1997, of the American Petroleum Institute, the entire disclosure of which is incorporated herein by reference. Generally, however, each cement mix comprised a base blend comprising the cementitious material listed in Table 15A, namely, 100 weight percent Class G cement for Sample No. 1, and 100 weight percent Class C cement for Sample Nos. 2 and 3.

The cement mix for sample nos. 2 and 3 further comprised the additives listed in Table 15A. The additives, namely the HR-5, CFR-2, Halad 344, and Halad 413 were dry-mixed with each base blend in the amounts as listed in Table 15A, where % bwob indicates a percentage based on the weight of the base blend. HR-5 is the tradename for a retarder comprising a refined lignosulfonate. CFR-2 is the tradename for a dispersant comprising sodium salt of naphthalene sulfonate condensed with formaldehyde. Halad 344 is the tradename for composition that comprises grafted polymers prepared by the polymerization of monomers or salts of monomers of N,N-dimethylacrylamide, 2-acrylamido-2-methylpropanesulfonic acid and acrylonitrile having a lignin or lignite or other backbone. Halad 413 is the tradename for a composition that comprises copolymers or salts of copolymers of N,N-dimethylacrylamide (NNDMA) and 2-acrylamido, 2-methyl propane sulfonic acid (AMPS). Each of HR-5, CFR-2, Halad 344 and Halad 413 are products commercially available from Halliburton Energy Services.

The base blend and the additives comprised the cement mix from which an initial cement composition was prepared. Three initial cement compositions were prepared by adding each cement mix to its own mixing fluid being maintained in a blender at 4000 RPM. For each of the initial cement compositions, the mixing fluid comprised water in the amount reported in Table 15A, where % bwob indicates a percentage based on the weight of the base blend. For Sample No. 1, the mixing fluid further comprised D-air 2, which is a polypropylene glycol commercially available from Halliburton Energy Services, Duncan, Okla. D-air 2 was added to the mixing fluid in a percentage based on the weight of the base blend (% bwob) as listed in Table 15A. The cement mix temperature and mixing fluid temperature were both 24° C. (75° F.).

The cement mix was added to the mixing fluid over a 15 second period. A cover was then placed on the blender, and mixing was continued at about 12,000 RPM for about 35 seconds. The blender was then slowed to about 4000 RPM and aqueous zeolite suspension nos. 1, 2 and 3 were added to each of the initial cement composition nos. 1, 2 and 3, respectively. The blender speed was maintained at about 4000 RPM until the initial cement composition and the aqueous zeolite suspension were a homogeneous blend. Each homogeneous blend is referred to as the final cement composition.

Example 15 illustrates that a cement mix can be blended initially with enough water to result in an initial cement composition having the consistency of a fluid slurry. The initial cement composition is then blended with a liquid zeolite suspension to form a final cement composition. Thus, the total water requirement of a final cement composition is that of the water in the initial cement composition and the water in the aqueous zeolite suspension (which is also indicated in Table 15A). The density of the initial cement composition can be measured within the measurement limitations of a densitometer, and then the aqueous zeolite suspension carrying the lightweight materials can be metered in. By metering in the aqueous zeolite suspension, the density of the lightweight cement composition being formed can be controlled more accurately. In addition, the aqueous zeolite suspension holds the lightweight materials in a stable suspension, thus avoiding separation of the lightweight materials.

TABLE 15A

|  | Sample No. 1 | Sample No. 2 | Sample No. 3 |
| --- | --- | --- | --- |
| Aq. Zeolite Suspens. Components | | | |
| Water (% bwob) | 106 | 60 | 60 |
| Zeolite (% bwob) | 35 | 30 | 30 |
| Spherelite (% bwob) | 30 | 40 | 40 |
| S-38 3M Scotchlite Beads (% bwob) | 32 | 0 | 0 |
| Aq. Zeolite Suspens. Properties | | | |
| Density | 839 kg/m$^3$ (6.99 lb/gal) | 1060 kg/m$^3$ (8.84 lb/gal) | 1060 kg/m$^3$ (8.84 lb/gal) |
| Total Fluid | 1.06 m$^3$/t (11.96 gal/sk) | 0.59 m$^3$/t (6.67 gal/sk) | 0.59 m$^3$/t (6.67 gal/sk) |
| Yield | 2.43 m$^3$/t (3.66 ft$^3$/sk) | 1.23 m$^3$/t (1.85 ft$^3$/sk) | 1.23 m$^3$/t (1.85 ft$^3$/sk) |
| Cement Mix Base Blend Components | | | |
| Class G cement (wt %) | 100 | 0 | 0 |
| Class C cement (wt %) | 0 | 100 | 100 |
| Cement Mix Additives | | | |
| HR-5 (% bwob) | 0.5 | 0 | 0 |
| CFR-2 (% bwob) | 0 | 0.3 | 0 |
| Halad-344 (% bwob) | 0 | 0 | 0.6 |
| Halad-413 (% bwob) | 0 | 0 | 1.00 |
| Mixing Fluid | | | |
| Water (% bwob) | 36.0 | 46.0 | 46.0 |
| D-air 2 (% bwob) | 0.5 | 0 | 0 |
| Initial Cement Composition Properties | | | |
| Density | 1952 kg/m$^3$ (16.27 lb/gal) | 1885 kg/m$^3$ (15.71 lb/gal) | 1879 kg/m$^3$ (15.66 lb/gal) |
| Water Requirement | 0.36 m$^3$/t (4.06 gal/sk) | 0.46 m$^3$/t (5.19 gal/sk) | 0.46 m$^3$/t (5.19 gal/sk) |
| Total Fluid | 0.41 m$^3$/t (4.56 gal/sk) | 0.46 m$^3$/t (5.19 gal/sk) | 0.46 m$^3$/t (5.19 gal/sk) |
| Yield | 0.72 m$^3$/t (1.09 ft$^3$/sk) | 0.78 m$^3$/t (1.17 ft$^3$/sk) | 0.79 m$^3$/t (1.19 ft$^3$/sk) |
| Final Cement Composition Properties (Initial Cement Comp. Blended with Aq. Zeolite Suspens.) | | | |
| Density | 1106 kg/m$^3$ (9.22 lb/gal) | 1381 kg/m$^3$ (11.51 lb/gal) | 1380 kg/m$^3$ (11.50 lb/gal) |
| Water Requirement | 0.46 m$^3$/t (5.19 gal/sk) | 0.46 m$^3$/t (5.19 gal/sk) | 0.46 m$^3$/t (5.19 gal/sk) |
| Total Fluid | 1.43 m$^3$/t (16.05 gal/sk) | 1.06 m$^3$/t (11.96 gal/sk) | 1.06 m$^3$/t (11.96 gal/sk) |
| Yield | 3.07 m$^3$/t (4.63 ft$^3$/sk | 2.00 m$^3$/t (3.02 ft$^3$/sk) | 2.01 m$^3$/t (3.03 ft$^3$/sk) |

Rheology, compressive strength, thickening time, free water, and settling data were tested for each of the aqueous zeolite suspensions, initial cement compositions, and the final cement compositions. The data is as listed in Table 15B.

The viscosity (dial reading) of the cement compositions was measured using a Fann Model 35 viscometer, and reported in the rheology results in Table 15B. The viscosity was taken as the measurement of the dial reading on the Fann Model 35 at the different rotational speeds as indicated in 600 to 3 RPM, and at the temperature as indicated in Table 15B. For example, the Fann Viscometer is rotated at 300 RPM (revolutions per minute) for 60 seconds and a value on the dial is read, the speed is then changed to 200 RPM and the new value on the dial reading taken. There are a number of theoretical models known to those of ordinary skill in the art that can be used to convert the values from the dial readings at the different RPM's into viscosity (centipoises).

period, the graduated cylinders were left standing. After two hours, the free fluid that had gathered on top of each sample inside the cylinder was measured.

With respect to the Aqueous Zeolite Suspension Properties, the free fluid data was gathered by pouring 250 mL of each of the aqueous zeolite suspensions directly into a 250 mL graduated glass cylinder. Each sample was stirred with a spatula during pouring, and then sealed with a plastic film wrap to prevent evaporation. A two hour test period was then initiated. During this two hour test period, the graduated cylinders were left standing. After two hours, the free fluid that had gathered on top of each sample inside the cylinder was measured.

The volume of free fluid formed in each of the above-described tests is reported in Table 15B, and provides an indication of settling, where a zero percent value indicates no settling. Settling data is based on observation of the degree of sample settling in the free water tests.

TABLE 15B

| | Dial Reading @ 27° C. (80° F.) | | | | | | Compress. Strength @ 66° C. | Thickening Time @ 57° C. | Free | |
|---|---|---|---|---|---|---|---|---|---|---|
| | 600 RPM | 300 RPM | 200 RPM | 100 RPM | 6 RPM | 3 RPM | (150° F.) MPa (psi) | (134° F.) (Hr:min) | water (mL/250 mL) | Settling |
| Aq. Zeolite Suspens. Properties | | | | | | | | | | |
| Sample No. 1 | 229 | 125 | 90 | 56 | 19 | 16 | n/a | n/a | 0 | none |
| Sample No. 2 | 206 | 86 | 53 | 39 | 17 | 15 | n/a | n/a | 0 | none |
| Sample No. 3 | 255 | 180 | 135 | 88 | 37 | 33 | n/a | n/a | 0 | none |
| Initial Cement Comp. Properties | | | | | | | | | | |
| Sample No. 1 | 165 | 45 | 33 | 22 | 10 | 9 | n/a | n/a | 0 | none |
| Sample No. 2 | 245 | 180 | 174 | 165 | 61 | 45 | n/a | n/a | 0 | none |
| Sample No. 3 | 300+ | 300+ | 300+ | 184 | 29 | 23 | n/a | n/a | 0 | none |
| Final Cement Comp. Properties | | | | | | | | | | |
| Sample No. 1 | — | 96 | 71 | 43 | 12 | 10 | 7.94 (1151) | 3:34 | 0 | none |
| Sample No. 2 | 150 | 104 | 86 | 67 | 33 | 24 | 14.99 (2172) | 1.14 | 0 | none |
| Sample No. 3 | — | 260 | 188 | 107 | 10 | 5 | 20.87 (3025) | 0:51 | 0 | none |

In addition, different viscometer models use different RPM values, thus, in some instances, a measurement is not available at a particular RPM value.

Rheology was tested according to the procedures set forth in Section 12 of the API Specification RP 10B, 22$^{nd}$ Edition, 1997, of the American Petroleum Institute (the entire disclosure of which is hereby incorporated as if reproduced in its entirety). The foregoing API procedure was modified in that the initial reading at 300 RPM was taken after 60 seconds continuous rotation at that speed. Dial readings at 200, 100, 60, 30, 6 and 3 were then recorded in descending order at 20-second intervals. The final reading at 600 RPM was taken after 60 seconds continuous rotation at that speed.

With respect to the Initial Cement Properties and the Final Cement Properties, free water data was gathered according to Section 15.5 of Addendum 2 of the API Specification 10B 22$^{nd}$ Edition, 1997, of the American Petroleum Institute, the entire disclosure of which is hereby incorporated herein by reference. The slurry was first conditioned in an atmospheric consistometer for 30 minutes. Generally according to said API Specification, 250 ml of each sample was then poured into its own 250 ml graduated glass cylinder. Each sample was stirred with a spatula during pouring, and then sealed with a plastic film wrap to prevent evaporation. A two hour test period was then initiated. During this two hour test The data in Table 15B illustrates that cement compositions blended with aqueous suspensions comprising zeolite and lightweight materials possess favorable rheological properties, good compressive strength, and good thickening time. The lack of settling and the free water data indicate that there is no segregation of the lighter weight materials.

EXAMPLE 16

Table 16 illustrates yet another embodiment of the cement compositions of the present invention, where zeolite is incorporated into a cement mix from which a foam cement composition is formed. The zeolite acts as a foam cement-stability agent.

A conventional foamed cement composition (Cement Composition No. 1) was prepared from a cement mix comprising a base blend comprising 56 weight percent Class G cement, 22 weight percent fly ash, and 22 weight percent fumed silica. The components of the base blend of the cement mix were dry-mixed by hand in a glass jar. The fly ash was Class F fly ash, which is commercially available from Halliburton Energy Services. Fumed silica is commercially available from Fritz Industries, Mesquite, Tex., USA.

An unfoamed cement composition was formed by adding the cement mix to a mixing fluid comprising water being maintained in a blender at 4000 RPM. The cement mix was added to the mixing fluid over a 15 second period. When all of the cement mix was added to the mixing fluid, a cover was placed on the blender and mixing was continued at about 12,000 RPM for about 35 seconds. The amount of water required in the blender is listed in Table 16 in % bwob, which represents a percentage based on total weight of the base blend. The dry-mix temperature and mixing fluid temperature were both 24° C. (75° F.).

For the preparation of Cement Comp. No. 2, an aqueous zeolite suspension was prepared that contained 48 weight percent zeolite. The method used to prepare the aqueous zeolite suspension was to add 7.2 kg of zeolite to 7.8 kg of water in a 5 gallon bucket, and stir with a variable speed Premier Mill Corp. laboratory dispersator mixer at low speed until a homogenous suspension was obtained. Chabazite, which is commercially available from C2C Zeolite Corporation of Calgary, Canada, was used as the zeolite. The aqueous zeolite suspension was then set aside for preparation of the base blend of the cement mix from which Cement Composition No. 2 was formed.

Cement Composition No. 2 was prepared from a cement mix comprising a base blend comprising 100 weight percent Class G cement, as reported in Table 16. Hydrated lime was dry-mixed with the base blend in the amount reported in Table 16, which is a percentage by weight of the base blend. Hydrated lime is a conventional additive for increasing the final strength of the cement composition. The Class G cement and the hydrated lime comprised the cement mix for composition No. 2.

After preparation of the cement mix, aqueous zeolite suspension in the amount reported in Table 16 was added to 293% bwob water in a blender and mixed at 4000 RPM for 1 minute. The 293% bwob water reported in Table 16 indicates a percentage based on the weight of the base blend of the cement mix. The aqueous zeolite suspension added to the water was the 48% suspension previously prepared and set aside. After blending of the water and the aqueous zeolite suspension, an unfoamed cement composition was prepared by adding the cement mix to the blender at 4000 RPM over about a 15 second period. The blender was then covered, and the blender speed was increased to 12,000 RPM for about 35 seconds.

Alternatively, water alone is maintained in the Waring blender prior to addition of the cement mix. According to this embodiment, the cement mix is added to water in the Waring blender over a 15 second period, at 4000 RPM of the blender. The blender is then covered, and the blender speed increased to 12,000 RPM for about 35 seconds. The blender is then slowed to about 4000 RPM, and the aqueous zeolite suspension is added. The blender speed is maintained at about 4000 RPM until a homogenous mix is achieved.

To generate a foamed cement composition from each of the above-described unfoamed cement compositions, the following procedure was followed. A 2-quart multiblade foam blender was assembled from the following components: a sealed mix container commercially available from Fann Instruments; blades commercially available Waring Laboratory Products; and a stand-off kit (extension rods) commercially available from Fann Instruments. Assembly of a multi-blade foam blender comprises modifying a standard mixing assembly similar to that of a conventional Waring blender. A extension rod is screwed on the mixing assembly, then a Waring blender blade is placed onto the extension rod. Another extension rod is then screwed on above the blade and the process repeated to give a multblade paddle having 4 extension rods and 5 sets of waring blender blade. A top spindle is placed on the top waring blender blade and this connects to a brushing in the lid of the multiblade foam blender to seal the unit.

About half of the unfoamed composition was added to the 2-quart multiblade foam blender. A foam additive comprising an ethoxylated alcohol ether sulfate surfactant, which is commercially available from Halliburton Energy Services under the tradename Zonesealant 2000, was then added to the blender in the amount as indicated in Table 16, where % bvow is a percent by volume of total water present in the unfoamed cement composition.

After addition of the foam additive, the remainder of the unfoamed composition was added to the blender, and the blender was shaken about three to five times. The foam in the blender was sheared at the maximum speed of 12,000 RPM for about 15 seconds, at which point the final foam density was obtained. Alternatively, if the multiblade foam blender has an audible blender speed change feature to indicate when the blender is full, shearing continues until the audible indication is given, at which point the final foam density is obtained.

The final foam density, foam quality measurement, and sedimentation data for each composition is as indicated in Table 16.

TABLE 16

|  | Cement Composition No. 1 | Cement Composition No. 2 |
|---|---|---|
| Cement Mix Base Blend Composition |  |  |
| Class G Cement (wt. %) | 56 | 100 |
| Class F Fly Ash (wt. %) | 22 | 0 |
| Fumed Silica (wt. %) | 22 | 0 |
| Cement Mix Additives |  |  |
| Hydrated Lime (% bwob) | 0 | 10 |
| Mixing Fluid |  |  |
| Water (% bwob) | 208 | 293 |
| Aqueous Zeolite Suspension | 0 | 182.44% bwob (62.27% bwow) |
| Properties of Unfoamed Composition | 1260 kg/m$^3$ (10.5 lb/gal) | 1260 kg/m$^3$ (10.5 lb/gal) |
| Properties of Foamed Composition |  |  |
| Foam additive (% bvow) (Zonesealant 2000) | 2 | 2 |
| Density | 960 kg/m$^3$ (8 lb/gal) | 960 kg/m$^3$ (8 lb/gal) |
| Foam quality | 23.9% | 24.1% |
| Sedimentation Tests |  |  |
| Density of Top | 0 kg/m$^3$ (0 lb/gal) | 863 kg/m$^3$ (7.19 lb/gal) |
| Density of Middle | 1144 kg/m$^3$ (9.54 lb/gal) | 871 kg/m$^3$ (7.26 lb/gal) |
| Density of Bottom | 1221 kg/m$^3$ (10.18 lb/gal | 871 kg/m$^3$ (7.26 lb/gal) |

The foam quality measurement is based on the amount of foam (air) required to decrease the density from that of the unfoamed cement composition (10.5 lb/gal) to that of the foamed cement composition (8 lb/gal), and is given as the percent of air by the total volume of the foamed composition.

Sedimentation data was gathered by allowing each composition to cure in a 4 by 2 inch plastic container at 49° C. (120° F.) for 48 hours. The cured compositions were then cut into three equal sections, top, middle and bottom. To determine the density of each section, the procedures set forth in Section 15.6.5 of API Specification RP 10B, 22$^{nd}$ Edition, 1997, of the American Petroleum Institute (the entire disclosure of which is hereby incorporated as if reproduced in its entirety) were followed. Generally, however, a 1000 mL beaker containing 700 mL of water was placed on a balance and tared to zero.

A noose of thin line was placed around the section to be measured, and the section was suspended by the line into the water in the beaker. The sample was suspended into the water so that it was totally immersed in the water, but was not touching the bottom or sides of the beaker, nor did it have air bubbles clinging to it. With the section thus suspended in the water, the weight indicated on the balance was recorded. The section was then lowered so that the section rested completely on the bottom of the beaker and weight indicated on the balance recorded. The section was then removed and the balance re-tared to zero. These procedures were then repeated for each section.

The density of each section was calculated by dividing the weight recorded when the section was placed on the bottom of the beaker by the weight recorded when the section was suspended in the water in the beaker and multiplying by 8.34.

The foam quality and sedimentation values listed in Table 16 illustrate that zeolite is an effective foam-cement stability agent.

EXAMPLE 17

Table 17 illustrates the incorporation of zeolite into the base system, which enables the use of a lower foam quality (less air per volume of base system) to produce lower density foamed cement.

Two conventional foamed cement compositions (Comp. Nos. 1 and 3) were prepared from a cement mix comprising a base blend comprising 100 weight percent Class G cement, as reported in Table 17. Bentonite as an additive was dry-mixed with the base blend by hand in a glass jar. The amount of bentonite mixed with each base blend is reported in Table 17 as a percentage based on weight of the base blend.

The base blend and the additive comprised the cement mix from which each unfoamed cement composition reported in Table 17 was prepared. An unfoamed cement composition was prepared from each cement mix by adding the cement mix to a mixing fluid comprising water being maintained in a blender at 4000 RPM. The cement mix was added to the mixing fluid over a 15 second period. When all of the cement mix was added to the mixing fluid, a cover was placed on the blender and mixing was continued at about 12,000 RPM for about 35 seconds. The amount of water required in the blender is listed in Table 17 in % bwob, which represents a percentage based on total weight of the base blend. The cement mix temperature and mixing fluid temperature were both 24° C. (75° F.).

An unfoamed cement composition for Composition No. 2 was prepared from a cement mix comprising a base blend comprising Class G cement and zeolite in the amounts (weight percents) reported in Table 17. The cement and the zeolite were dry-mixed by hand in a glass jar. Chabazite, which is commercially available from C2C Zeolite Corporation of Calgary, Canada, was used as the zeolite. An unfoamed cement composition was prepared from the cement mix by adding the cement mix over a 15 second period to a mixing fluid comprising water being maintained in a blender at 4000 RPM. When addition of the cement mix was complete, a cover was placed on the blender and mixing was continued at about 12,000 RPM for about 35 seconds. The amount of water required in the blender is listed in Table 17 in % bwob, which represents a percentage based on total weight of the base blend. The cement mix temperature and mixing fluid temperature were both 24° C. (75° F.).

For the preparation of Comp. No. 4, an aqueous zeolite suspension was prepared that contained 48 weight percent zeolite. The method used to prepare the aqueous zeolite suspension was to add 7.2 kg of zeolite to 7.8 kg of water in a 5 gallon bucket, and stir with a variable speed Premier Mill Corp. laboratory dispersator mixer at low speed until a homogeneous suspension was obtained. Chabazite, which is commercially available from C2C Zeolite Corporation of Calgary, Canada, was used as the zeolite. The aqueous zeolite suspension was then set aside for preparation of the base blend of the cement mix from which Comp. No. 4 was formed.

Cement Composition No. 4 was prepared from a cement mix comprising a base blend comprising 100 weight percent Class G cement as reported in Table 17. After preparation of the cement mix, 182.4% bwob of the aqueous zeolite suspension was added to 106% bwob water in a blender and mixed at 4000 RPM for 1 minute. The % bwob reported in Table 17 for both the water and the aqueous zeolite suspension indicates a percentage based on the weight of the base blend of the cement mix. The aqueous zeolite suspension added to the water was the 48% suspension previously prepared and set aside. After blending of the water and the aqueous zeolite suspension, an unfoamed cement composition was prepared by adding the cement mix to the blender at 4000 RPM over about a 15 second period. The blender was then covered, and the blender speed was increased to 12,000 RPM for about 35 seconds.

Alternatively, water alone is maintained in the Waring blender prior to addition of the cement mix. According to this embodiment, the cement mix is added to water in the Waring blender over a 15 second period, at 4000 RPM of the blender. The blender is then covered, and the blender speed increased to 12,000 RPM for about 35 seconds. The blender is then slowed to about 4000 RPM, and the aqueous zeolite suspension is added. The blender speed is maintained at about 4000 RPM until a homogenous mix is achieved.

To generate a foamed cement composition from each of the above-described unfoamed cement compositions, the following procedure was followed. A 2-quart multiblade foam blender was assembled from the following components: a sealed mix container commercially available from Fann Instruments; blades commercially available Waring Laboratory Products; and a stand-off kit (extension rods) commercially available from Fann Instruments. Assembly of a multi-blade foam blender comprises modifying a standard mixing assembly similar to that of a conventional Waring blender. A extension rod is screwed on the mixing assembly, then a Waring blender blade is placed onto the extension rod. Another extension rod is then screwed on above the blade and the process repeated to give a multblade paddle having 4 extension rods and 5 sets of waring blender blade. A top spindle is placed on the top waring blender blade and this connects to a brushing in the lid of the multiblade foam blender to seal the unit.

About half of the unfoamed composition was added to the 2-quart multiblade foam blender. A foam additive comprising an ethoxylated alcohol ether sulfate surfactant, which is commercially available from Halliburton Energy Services under the tradename Zonesealant 2000, was then added to the blender in the amount as indicated in Table 17, where % bvow is a percent by volume of total water present in the unfoamed cement composition.

After addition of the foam additive, the remainder of the unfoamed composition was added to the blender, and the blender was shaken about three to five times. The foam in the blender was sheared at the maximum speed of 12,000 RPM for about 15 seconds, at which point the final foam density was obtained. Alternatively, if the multiblade foam blender has an audible blender speed change feature to indicate when the blender is full, shearing continues until the audible indication is given, at which point the final foam density is obtained.

The final foam density, foam quality measurement, and compressive strength data for each foamed cement composition is as indicated in Table 17.

micronized Portland cement, and zeolite was formed by dry-mixing the cements and the zeolite in the amounts reported in the tables by hand in a glass jar. The cement mix additives, i.e., the sodium sulfate and cementing additive, were also dry-mixed with the base blend in the glass jar in the amounts reported in Tables 18A and 18B. The sodium

TABLE 17

|  | Comp. No. 1 | Comp. No. 2 | Comp. No. 3 | Comp. No. 4 |
|---|---|---|---|---|
| Cement Mix Base Blend Components |  |  |  |  |
| Class G cement (wt. %) | 100 | 70 | 100 | 100 |
| Zeolite (wt. %) | 0 | 30 | 0 | 0 |
| Cement Mix Additives |  |  |  |  |
| Bentonite (% bwob) | 4 | 0 | 8 | 0 |
| Mixing Fluid |  |  |  |  |
| Water (% bwob) | 72 | 62 | 95 | 106 |
| Aqueous Zeolite (% bwob) | 0 | 0 | 0 | 182.4 |
| Density of Unfoamed Composition kg/m$^3$ (lb/gal) | 1680 (14) | 1680 (14) | 1560 (13) | 1440 (12) |
| Foam additive (% bvow) (Zone Sealant 2000) | 2 | 2 | 2 | 2 |
| Properties of Foamed Composition |  |  |  |  |
| Density kg/m$^3$ (lb/gal) | 1200 (10.0) | 1200 (10.0) | 1200 (10.0) | 1200 (10.0) |
| Foam Quality (%) | 28.2 | 28.3 | 23.5 | 16.0 |
| Compressive Strength at 49° C. (120° F.) and 24 Hr | 2.28 MPa (330 psi) | 3.11 MPa (450 psi) | 1.01 MPa (146 psi) | 1.07 MPa (155 psi) |
| Compressive Strength at 49° C. (120° F.) and 48 Hr | 3.60 MPa (522 psi) | 7.45 MPa (1078 psi) | 1.84 MPa (268 psi) | 2.54 MPa (368 psi) |

The foam quality measurement is based on the amount of foam (air) required to decrease the density from that of the unfoamed cement composition to that of the foamed cement composition (10 lb/gal), and is given as the percent of air by the total volume of the foamed composition.

The compressive strength data was determined according to Non-Destructive Sonic Testing as set forth in API Specification 10B 22$^{nd}$ Edition, 1997, of the American Petroleum Institute, the entire disclosure of which is hereby incorporated herein by reference.

The foam quality and compressive strength data indicated in Table 17 illustrate that zeolite, in both a dry and an aqueous embodiment, is useful in the preparation of lightweight density foamed cement compositions with a lower foam quality and good compressive strength.

EXAMPLE 18

According to another embodiment, zeolite is incorporated into a cement composition comprising micronized cement. The term "micronized cement" as used herein means a cement consisting of discrete particles having a particle size of not greater than about 30 microns. Preferably, the micronized cement is a Portland cement. Cement compositions made from cement mixes comprising micronized cement and zeolite possess good compressive strength and rheological properties.

Thirty cement compositions, each having a density as reported in Tables 18A and 18B were prepared according to API Specification RP 10B, 22$^{nd}$ Edition, 1997, of the American Petroleum Institute (the entire disclosure of which is hereby incorporated as if reproduced in its entirety). Following said API specification, a cement mix comprised of a base blend comprising Class C cement, MicroMatrix brand sulfate and cementing additive amounts are reported as percentages of the weight of the base blend (% bwob) of each cement mix.

The zeolite used was clinoptilolite, which is commercially available from C2C Zeolite Corporation of Calgary, Canada. MicroMatrix brand cement is commercially available from Halliburton Energy Services, Duncan Okla. The cementing additive is commercially available from Halliburton Energy Services as FDP-C661-VA, and comprises sodium sulfate, sodium carbonate, and other trace minerals. As indicated in Tables 18A and 18B, the cement mix for composition No. 8 further comprised Spherelite, which was dry-mixed therewith in the indicated amount based on the weight of the base blend. The cement mix for composition Nos. 1-3 and 18 further comprised Econolite, which was dry-mixed therewith in the indicated amount based on the weight of the base blend. Spherelite and Econolite are tradenames for lightweight materials commercially available from Halliburton Energy Services.

Each cement mix comprised the base blend and the additives as reported in Tables 18A and 18B. A cement composition was prepared from the cement mix by adding the cement mix to mixing fluid being maintained in a blender at 4000 RPM. All of the cement mix was added to the mixing fluid over a 15 second period. A cover was then placed on the blender, and mixing was continued at about 12,000 RPM for about 35 seconds. For each of the cement compositions, the mixing fluid was water in the amount reported in Tables 18A and 18B, where % bwob indicates a percentage based on total weight of the base blend of the cement mix. The cement mix temperature and mixing fluid temperature were both 24° C. (75° F.).

TABLE 18A

|  | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|
| Cement Mix Base Blend | | | | | | | | | | | |
| Class C Cement (wt. %) | 60 | 60 | 60 | 60 | 57 | 57 | 57 | 57 | 57 | 57 | 57 |
| Micronized Portland Cement (wt. %) (MicroMatrix) | 0 | 0 | 0 | 0 | 3 | 3 | 3 | 3 | 3 | 3 | 3 |
| Zeolite (wt. %) | 40 | 40 | 40 | 40 | 40 | 40 | 40 | 40 | 40 | 40 | 40 |
| Cement Mix Additives | | | | | | | | | | | |
| Sodium sulfate (% bwob) | 6 | 6 | 6 | 8 | 8 | 10 | 10 | 8 | 10 | 8 | 8 |
| Cementing Additive (% bwob) (FDP-C661-VA) | 2 | 2 | 2 | 2 | 2 | 0 | 2 | 1 | 2 | 0 | 1 |
| Econolite (% bwob) | 2 | 2 | 2 | 0 | 0 | 0 | 0 | 0 | 0 | 0 | 0 |
| Spherelite (% bwob) | 0 | 0 | 0 | 0 | 0 | 0 | 0 | 9 | 0 | 0 | 0 |
| Mixing Fluid | | | | | | | | | | | |
| Water (% bwob) | 197.6 | 179.23 | 163.76 | 164.11 | 197.40 | 197.53 | 200.83 | 166.68 | 182.47 | 161.16 | 162.52 |
| Density kg/m³ (lb/gal) | 1300 (10.8) | 1325 (11.0) | 1350 (11.0) | 1350 (11.2) | 1300 (10.8) | 1300 (10.8) | 1300 (10.8) | 1308 (10.7) | 1325 (11.0) | 1350 (11.2) | 1350 (11.2) |

TABLE 18B

|  | No. 12 | No. 13 | No. 14 | No. 15 | No. 16 | No. 17 | No. 18 | No. 19 | No. 20 | No. 21 |
|---|---|---|---|---|---|---|---|---|---|---|
| Cement Mix Base Blend | | | | | | | | | | |
| Class C Cement (%) | 55 | 55 | 55 | 55 | 55 | 60 | 60 | 60 | 60 | 57 |
| Micronized Portland Cement (%) (MicroMatrix) | 5 | 5 | 5 | 5 | 5 | 0 | 0 | 0 | 3 | 3 |
| Zeolite (%) | 40 | 40 | 40 | 40 | 40 | 40 | 40 | 40 | 37 | 40 |
| Cement Mix Additives | | | | | | | | | | |
| Sodium sulfate (% bwob) | 0 | 8 | 8 | 8 | 8 | 6 | 6 | 6 | 8 | 8 |
| Cementing Additive (% bwob) (FDP-C661-VA) | 0 | 0 | 0 | 1 | 2 | 0 | 1 | 0 | 0 | 1 |
| Econolite (% bwob) | 0 | 0 | 0 | 0 | 0 | 0 | 1 | 0 | 0 | 0 |
| Spherelite (% bwob) | 0 | 0 | 0 | 0 | 0 | 0 | 0 | 0 | 0 | 0 |
| Mixing Fluid | | | | | | | | | | |
| Water (% bwob) | 149.66 | 161.0 | 161.0 | 162.37 | 163.73 | 190.93 | 194.10 | 158.5 | 195.1 | 195.6 |
| Density kg/m³ (lb/gal) | 1350 (11.2) | 1350 (11.2) | 1350 (11.2) | 1350 (11.2) | 1300 (10.8) | 1350 (11.2) | 1300 (10.8) | 1350 (11.2) | 1300 (10.8) | 1350 (11.2) |

TABLE 18C

|  | No. 22 | No. 23 | No. 24 | No. 25 | No. 26 | No. 27 | No. 28 | No. 29 | No. 30 |
|---|---|---|---|---|---|---|---|---|---|
| Cement Mix Base Blend | | | | | | | | | |
| Class C Cement (%) | 55 | 48 | 45 | 60 | 57 | 54 | 51 | 60 | 60 |
| Micronized Portland Cement (%) (MicroMatrix) | 5 | 12 | 15 | 6 | 3 | 6 | 9 | 3 | 6 |
| Zeolite (%) | 40 | 40 | 40 | 34 | 40 | 40 | 40 | 37 | 34 |
| Cement Mix Additives | | | | | | | | | |
| Sodium sulfate (% bwob) | 8 | 8 | 8 | 8 | 8 | 8 | 8 | 8 | 8 |
| Cementing Additive (% bwob) (FDP-C661-VA) | 1 | 0 | 0 | 0 | 0 | 0 | 0 | 1 | 1 |
| Econolite (% bwob) | 0 | 0 | 0 | 0 | 0 | 0 | 0 | 0 | 0 |
| Spherelite (% bwob) | 0 | 0 | 0 | 0 | 0 | 0 | 0 | 0 | 0 |
| Mixing Fluid | | | | | | | | | |
| Water | 195.33 | 195.09 | 194.83 | 197.89 | 195.86 | 195.61 | 195.35 | 196.68 | 199.56 |
| Density kg/m³ (lb/gal) | 1350 (11.2) | 1300 (10.8) | 1300 (10.8) | 1300 (10.8) | 1300 (10.8) | 1300 (10.8) | 1300 (10.8) | 1300 (10.8) | 1300 (10.8) |

The results of compressive strength testing performed on composition nos. 1-30 are listed in Table 18D. The compressive strength was determined by Non-Destructive Sonic Testing as set forth in API Specification 10B 22$^{nd}$ Edition, 1997, of the American Petroleum Institute, the entire disclosure of which is hereby incorporated herein by reference. The test temperature (Test Temp) is reported in a "number/number" format because the test samples of the cement compositions were conditioned in an atmospheric consistometer for 90 minutes at 50° C., then allowed to cool to 30° C. in an Ultrasonic Cement Analyzer (UCA). The samples were the cured in the UCA at 30° C. for the duration of the compressive strength testing.

was poured into its own 250 ml graduated glass cylinder. Each cement composition was stirred with a spatula during pouring, and then sealed with a plastic film wrap to prevent evaporation. A two hour test period was then initiated. During this two hour test period, the graduated cylinders were left standing so that the cement compositions in the cylinders underwent static curing. After two hours, the free fluid that had gathered on top of each cement composition inside the cylinder was measured. The percent of free fluid was calculated as the measured milliliters of free fluid multiplied by 100 and then divided by the 250 milliliters of the initial cement composition.

TABLE 18C

| | | COMPRESSIVE STRENGTH | | | | |
|---|---|---|---|---|---|---|
| No. | Test Temp ° C. (° F.) | Time to 0.35 MPa (50 psi) (Hr:Min) | Time to 3.5 MPa (500 psi) (Hr:Min) | Final Strength MPa (psi) | Time to Final Strength (Hr:Min) | Strength @ 48 hours MPa (psi) |
| 1 | 50/30 (122/86) | 9:12 | — | 3.20 (464) | 166:45 | 2.03 (294) |
| 2 | 50/30 (122/86) | 9:01 | — | 2.89 (419) | 166.30 | 2.10 (304) |
| 3 | 50/30 (122/86) | 8:49 | — | 3.38 (490) | 166:04 | 2.14 (310) |
| 4 | 50/30 (122/86) | 9:42 | 70:11 | 4.36 (632) | 138:46 | 2.55 (370) |
| 5 | 50/30 (122/86) | 4:22 | — | 3.02 (438) | 88.07 | 1.83 (265) |
| 6 | 50/30 (122/86) | 16:24 | — | 2.48 (359) | 66:58 | 1.66 (241) |
| 7 | 50/30 (122/86) | 9:18 | — | 3.19 (462) | 66:22 | 2.62 (380) |
| 8 | 50/30 (122/86) | 7:27 | 42:01 | 4.75 (688) | 114:51 | 3.86 (559) |
| 9 | 50/30 (122/86) | 8:38 | 52:40 | 4.40 (638) | 116:37 | 3.10 (449) |
| 10 | 50/30 (122/86) | 6:32 | 43:14 | 5.02 (728) | 88:40 | 3.73 (541) |
| 11 | 50/30 (122/86) | 5:09 | 37:53 | 5.85 (848) | 92:19 | 4.28 (620) |
| 12 | 50/30 (122/86) | — | — | 0.25 (36) | 45:25 | — |
| 13 | 25 (77) | 12:57 | — | 3.36 (487) | 88:40 | 2.42 (351) |
| 14 | 50/30 (122/86) | 5:17 | 39:53 | 4.02 (583) | 46:12 | ~4.14 (600) |
| 15 | 50/30 (122/86) | 8:01 | 66:15 | 4.23 (613) | 91:49 | 2.42 (351) |
| 16 | 50/30 (122/86) | 4:45 | 37:16 | 4.94 (716) | 138:47 | 4.14 (600) |
| 20 | 50/30 (122/86) | — | — | 0.22 (32) | 18:00 | — |
| 24 | 50/30 (122/86) | 10:55 | — | 1.06 (154) | 21.08 | — |
| 25 | 50/30 (122/86) | 16:31 | — | 0.40 (58) | 16:31 | — |
| 26 | 50/30 (122/86) | 12:54 | — | 2.40 (348) | 105:31 | 1.73 (251) |
| 27 | 50/30 (122/86) | 14:28 | — | 0.52 (75) | 19:42 | — |
| 28 | 50/30 (122/86) | 14:28 | — | 1.05 (152) | 34:22 | — |
| 29 | 50/30 (122/86) | 11:15 | — | 3.20 (464) | 90:04 | 1.90 (275) |
| 30 | 50/30 (122/86) | 4:22 | — | 3.25 (471) | 89:48 | 1.93 (280) |

Table 18D illustrates that cement compositions comprising zeolite and micronized cement (e.g., Nos. 29-30) reach a designated MPa value in lesser amounts of time and achieved higher final strengths in less time as compared to cement compositions that do not comprise micronized cement (e.g, Nos. 1-3).

TABLE 18E

| | No. 17 | No. 18 | No. 19 | No. 20 | No. 21 | No. 22 | No. 23 | No. 24 | No. 25 |
|---|---|---|---|---|---|---|---|---|---|
| Test Temp ° C. (° F.) | 20 (68) | 20 (68) | 20 (68) | 20 (68) | 20 (68) | 20 (68) | 20 (68) | 20 (68) | 20 (68) |
| % Free Water | 16 | 0.12 | 2.4 | <0.1 | <0.1 | <0.1 | 0 | 0 | 0 |

The results of free water testing performed on composition Nos. 17-25 are listed in Table 18E. Free water data was gathered according to Section 15.5 of Addendum 2 of the API Specification 10B 22$^{nd}$ Edition, 1997, of the American Petroleum Institute, the entire disclosure of which is hereby incorporated herein by reference. Generally according to said API Specification, 250 ml of each cement composition Table 18E illustrates that cement compositions comprising zeolite and micronized cement (e.g., Nos. 20-25) develop lesser amounts of free water as compared to cement compositions that do not comprise micronized cement (e.g, Nos. 17-19).

Although only a few exemplary embodiments of this invention have been described in detail above, those skilled

The invention claimed is:

1. A wellbore sealing low density foamed cement composition comprising:
   a low density base comprising:
     at least one cementitious material;
     a zeolite foam stability agent; and
     a mixing fluid; and
   at least one of a foaming agent, a surfactant and air whereby the at least one of a foaming agent, a surfactant and air foams the low density base to reduce the density of the foamed cement composition to less than the density of a normal weight cement;
   wherein the low density base comprising a zeolite foam stability agent has an enhanced compressive strength compared to a low density base that does not include the zeolite foam stability agent.

2. The wellbore sealing low density foamed cement composition of claim 1 wherein the zeolite is represented by the formula:

$$M_{a/n}[(AlO_2)_a(SiO_2)_b] \cdot xH_2O$$

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P; n represents the cation valence; the ratio of b:a is in a range from greater than or equal to 1 and less than or equal to 5; and x represents the moles of water entrained into the zeolite framework.

3. The wellbore sealing low density foamed cement composition of claim 1, wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

4. The wellbore sealing low density foamed cement composition of claim 1 wherein the cement composition comprises zeolite in an amount from at least about 30 weight percent.

5. The wellbore sealing low density foamed cement composition of claim 1 wherein the cement composition comprises at least one cementitious material selected from the group consisting of micronized cement, Portland cement, pozzolan cement, gypsum cement, aluminous cement, silica cement, and alkaline cement.

6. The wellbore sealing low density foamed cement composition of claim 1 further comprising at least one additive selected from the group consisting of accelerating additives, lightweight additives, dispersants, fluid loss control additives and surfactants.

7. The wellbore sealing low density foamed cement composition of claim 1 further comprising at least one accelerating additive selected from the group consisting of sodium sulfate, sodium carbonate, calcium sulfate, calcium carbonate, potassium sulfate, and potassium carbonate.

8. The wellbore sealing low density foamed cement composition of claim 1 further comprising at least one accelerating additive selected from the group consisting of sodium sulfate, calcium sulfate, and potassium sulfate; and at least one accelerating additive selected from the group consisting of sodium carbonate, calcium carbonate, and potassium carbonate.

9. The wellbore sealing low density foamed cement composition of claim 1 further comprising a fluid loss control additive selected from the group consisting of anionic water based soluble polymers, hydrophobically modified anionic water based soluble polymers, non-ionic water based soluble polymers and hydrophobically modified non-ionic water based soluble polymers.

10. The wellbore sealing low density foamed cement composition of claim 1 further comprising a fluid loss control additive selected from the group consisting of hydroxyethylcellulose, hydrophobically modified hydroxyethylcellulose, carboxymethylhydroxyethylcellulose, guar, modified guar, polyvinyl alcohol, montmorillonite clay, anhydrous sodium silicate, grafted polymers prepared by the polymerization of monomers or salts of monomers of N,N-dimethylacrylamide, 2-acrylamido-2-methylpropanesulfonic acid and acrylonitrile having a lignin or lignite or other backbone, and copolymers or salts of copolymers of N,N-dimethylacrylamide and 2-acrylamido-2-methylpropanesulfonic acid.

11. The wellbore sealing low density foamed cement composition of claim 1 wherein a flow enhancing agent is absorbed on the zeolite.

12. The wellbore sealing low density foamed cement composition of claim 11 wherein the flow enhancing agent is present in an amount of from about 15% to about 25% by weight of the zeolite.

13. The wellbore sealing low density foamed cement composition of claim 1 wherein the zeolite has a mean particle size of about 100 microns or less.

14. The wellbore sealing low density foamed cement composition of claim 1 wherein the zeolite has a mean particle size of from about 3 microns to about 15 microns.

15. The wellbore sealing low density foamed cement composition of claim 1 wherein the at least one cementitious material comprises particles having a size of up to about 30 microns.

16. The wellbore sealing low density foamed cement composition of claim 1 wherein the mixing fluid comprises water.

17. The wellbore sealing low density foamed cement composition of claim 1 further comprising at least one of a defoaming agent and bentonite.

18. The wellbore sealing low density foamed cement composition of claim 1 wherein:
   the zeolite is present in an amount of from about 35% to about 50% by weight; and
   the cement composition has a density up to about 13.5 lb/gal.

19. A lightweight cement composition comprising:
   at least one cementitious material;
   zeolite in an amount of at least about 15 percent by weight of the cementitious material, wherein:
     the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite; and
     the zeolite has a mean particle size of about 3 to 15 micrometers; and
   a mixing fluid;
   wherein the lightweight cement composition has a density of less than 12.5 pounds per gallon.

20. The lightweight cement composition of claim 19 wherein the cement mix comprises zeolite in an amount of at least about 20 percent by weight of the cementitious material.

21. The lightweight cement composition of claim 19 wherein the cement composition comprises at least one cementitious material selected from the group consisting of micronized cement, Portland cement, pozzolan cement, gypsum cement, aluminous cement, silica cement, and alkaline cement.

22. The lightweight cement composition of claim 19 further comprising at least one additive selected from the group consisting of accelerating additives, lightweight additives, dispersants, fluid loss control additives and surfactants.

23. The lightweight cement composition of claim 19 wherein the cementitious material, the zeolite, and the mixing fluid are present in relative amounts sufficient to form a slurry that can be placed in a wellbore penetrating a subterranean zone, and develop compressive strength therein sufficient to seal the subterranean zone.

24. The lightweight cement composition of claim 23 wherein the slurry further comprises at least one of a foaming agent, a surfactant and air.

25. The lightweight cement composition of claim 24 wherein the slurry is foamed.

26. The wellbore sealing low density foamed cement composition of claim 1 wherein the cement composition comprises zeolite in an amount of at least about 40 weight percent.

27. The wellbore sealing low density foamed cement composition of claim 1 wherein the cement composition comprises zeolite in an amount of at least about 50 weight percent.

28. The lightweight cement composition of claim 19 wherein the cement composition comprises zeolite in an amount of at least about 40 weight percent of the weight of the cementitious material.

29. The lightweight cement composition of claim 19 wherein the cement composition comprises zeolite in an amount of at least about 60 weight percent of the weight of the cementitious material.

* * * * *